(12) United States Patent
Kazuno et al.

(10) Patent No.: US 9,776,622 B2
(45) Date of Patent: Oct. 3, 2017

(54) POWER SYSTEM

(71) Applicant: HONDA MOTOR CO., LTD., Tokyo (JP)

(72) Inventors: Shuichi Kazuno, Wako (JP); Yasushi Kojima, Wako (JP); Yasutaka Sakai, Wako (JP); Hibiki Saeki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/325,719

(22) PCT Filed: Jul. 14, 2014

(86) PCT No.: PCT/JP2014/068713
§ 371 (c)(1),
(2) Date: Jan. 12, 2017

(87) PCT Pub. No.: WO2016/009476
PCT Pub. Date: Jan. 21, 2016

(65) Prior Publication Data
US 2017/0158189 A1    Jun. 8, 2017

(51) Int. Cl.
*B60W 20/13*  (2016.01)
*B60W 20/15*  (2016.01)
(Continued)

(52) U.S. Cl.
CPC ............. *B60W 20/13* (2016.01); *B60K 1/02* (2013.01); *B60K 6/32* (2013.01); *B60K 6/42* (2013.01); *B60W 10/08* (2013.01); *B60W 20/15* (2016.01); *B60L 2240/42* (2013.01); *B60W 2710/08* (2013.01)

(58) Field of Classification Search
CPC .... B60W 30/18; B60W 30/182; B60W 40/02; B60W 20/15; B60L 11/18
See application file for complete search history.

(56) References Cited

U.S. PATENT DOCUMENTS 7,906,863 B2 * 3/2011 Yaguchi ................. B60K 6/365
290/40 B
2008/0018111 A1   1/2008 Yaguchi
2012/0146421 A1   6/2012 Umayahara

FOREIGN PATENT DOCUMENTS

JP    08-256439     10/1996
JP    2009-303359   12/2009
(Continued)

OTHER PUBLICATIONS

International Search Report for corresponding International Application No. PCT/JP2014/068713, dated Oct. 14, 2014.
(Continued)

*Primary Examiner* — John Walters
*Assistant Examiner* — James Triggs
(74) *Attorney, Agent, or Firm* — Mori & Ward, LLP

(57) ABSTRACT

A power management device of a power system manages the power generation quantity of the whole power system. A power generation control device controls a power generation device using a power generation command value (Ifccon1req) of the power generation device, said power generation command value having been acquired from the power management device via a first signal system, and a parameter (Ibat) that is directly acquired from a parameter acquisition unit via a second signal system.

10 Claims, 17 Drawing Sheets

(51) Int. Cl.
*B60K 1/02* (2006.01)
*B60K 6/32* (2007.10)
*B60K 6/42* (2007.10)
*B60W 10/08* (2006.01)

(56) References Cited

FOREIGN PATENT DOCUMENTS

| | | |
|---|---|---|
| JP | 2010-045889 | 2/2010 |
| JP | 2010-200529 | 9/2010 |
| JP | 2013-169096 | 8/2013 |
| WO | WO 2011/021263 | 2/2011 |

OTHER PUBLICATIONS

Written Opinion for corresponding International Application No. PCT/JP2014/068713, dated Oct. 14, 2014.

* cited by examiner

FIG. 10  COMPARATIVE EXAMPLE

FIG. 11 SECOND EMBODIMENT

POWER SYSTEM

TECHNICAL FIELD

The present invention relates to an electric power system.

BACKGROUND ART

A hybrid electronic control unit (70) of U.S. Patent Application Publication No. 2008/0018111 (hereinafter referred to as the "US 2008/0018111 A1"), sets a drive point of an engine (22) and torque commands Tm1* and Tm2* of motors MG1 and MG2 in a range between an input limit and an output limit of a battery (50), in order to satisfy a preset output power demand. Further, the hybrid electronic control unit (70) sends the drive point of the engine (22) to an engine ECU (24) and the torque commands Tm1* and Tm2* to a motor ECU (40), together with the input limit and the output limit of the battery (50) to the motor ECU (40) (Abstract).

The motor ECU (40) verifies whether the operations of the motors MG1 and MG2 with the torque commands Tm1* and Tm2* are in the range between the input limit and the output limit of the battery (50). When the operations of the motors MG1 and MG2 are out of the range between the input limit and the output limit of the battery (50), the motor ECU (40) resets the torque commands Tm2* and Tm2* to make the operations of the motors MG1 and MG2 in the range between the input limit and the output limit and controls the operations of the motors MG1 and MG2 with the reset torque commands Tm1* and Tm2*. This arrangement effectively prevents the battery from being overcharged with excessive electric power or from being overdischarged to supply excessive electric power even in the state of electric power imbalance due to a communication lag (Abstract).

The communication lag herein means a time delay by communication (paragraph [0003]). More specifically, the communication lag occurs in a period from the timing of making operation commands (torque command Tm1*, torque command Tm2*) to the timing of controlling the operations of power generation means (engine 22) or electric motors (motors MG1, MG2) ([0007]).

SUMMARY OF INVENTION

As described above, US 2008/0018111 A1 describes a technique aimed to protect the battery by limiting the output of the power generation means (engine 22) and the electric motors (motor MG1, MG2). However, from the viewpoint of protecting the battery (energy storage device), there is room for making further improvements.

For example, in US 2008/0018111 A1, the motor control routine (FIG. 8) is repeatedly performed by the motor ECU (40) at preset time intervals, for example, at every several msec. (last line of paragraph [0057]). The routine includes a series of flows from the acquisition (S200) of the torque commands Tm1*, Tm2*, motor rotation speeds Nm1, Nm2, and battery input and output limits Win, Wout, to the control (S300) of the battery motors MG1, MG2 by the torque commands Tm1*, Tm2* (FIG. 8). Therefore, it appears that the acquisition cycle of the torque commands Tm1*, Tm2*, and the control cycle of the motors MG1, MG2 are the same.

In this regard, in the case where there are constraints with the communication cycles (i.e., acquisition cycle of the torque commands Tm1*, Tm2*, etc.) between the hybrid electronic control unit (70) and the motor ECU (40), rapid changes in the input to, or the output from the battery may not be handled. Such rapid changes may include, for example, rapid increase in the input electric power (electrical energy) to the battery due to the sharp decrease in power consumption of the drive motor due to locking of the wheels, etc.

The present invention has been made taking the above problems into account, and an object of the present invention is to provide an electric power system in which it is possible to protect an energy storage device more appropriately.

According to an aspect of the present invention, an electric power system includes a power generation device, an energy storage device, a drive motor driven by electric power from the power generation device and the energy storage device, a power generation control unit configured to control a power generation amount of the power generation device, a parameter acquisition unit configured to obtain a parameter regarding an input to, or an output from the energy storage device, an electric power management unit provided separately from the power generation control unit, a first signal system connecting the power generation control unit and the electric power management unit, and a second signal system bypassing the electric power management unit and connecting the power generation control unit and the parameter acquisition unit. The power management unit is configured to manage an amount of power generation of the electric power system as a whole, and the power generation control unit is configured to use a power generation command value of the power generation device obtained from the electric power management unit through the first signal system and the parameter obtained from the parameter acquisition unit through the second signal system to control the power generation device.

In the present invention, the power generation control unit uses the power generation command value of the power generation device obtained from the power generation management unit through the first signal system and the parameter obtained from the parameter acquisition unit through the second signal system to control the power generation device. Therefore, for example, in the normal state, the power generation command value is used mainly, and if an instantaneous change occurs in parameters regarding inputs to, or outputs from the energy storage device (e.g., rapid increase in the input electric power to the energy storage device resulting from rapid decrease in the power consumption of the drive motor due to locking of the wheels, etc.), by focusing on the change of parameter, it becomes possible to control power generation of the energy storage device. Therefore, it becomes possible to protect the energy storage device responsive to the rapid change in the input to, or output from the energy storage device.

The power generation control unit may be configured to correct a power generation command value of the power generation device obtained from the electric power management unit through the first signal system or a limit value of the power generation command value using the parameter obtained from the parameter acquisition unit through the second signal system, to control the power generation device. In this manner, it becomes possible to protect the energy storage device by avoiding the rapid change in the input to or the output from the energy storage device.

The electric power generation control unit may be configured to obtain the power generation command value of the power generation device from the electric power management unit through the first signal system at a first cycle. The parameter may be obtained from the parameter acquisition unit through the second signal system at a second cycle which is shorter than the first cycle, and control of the power generation device using the power generation command value corrected using the parameter may be implemented at a third cycle which is smaller than the first cycle.

In the present invention, the power generation control unit corrects the power generation command value of the power generation device obtained from the electric power management unit through the first signal system or the limit value of the power generation command value using the parameter obtained from the parameter acquisition unit through the second signal system to control the power generation device. Further, the cycle (second cycle) of obtaining the parameter and the cycle (third cycle) of controlling the power generation device are shorter than the cycle (first cycle) of obtaining the power generation command value of the power generation device. Therefore, it becomes possible to control power generation of the power generation device responsive to the instantaneous change in the parameter (e.g., rapid increase in the input electric power to the energy storage device resulting from rapid decrease in the power consumption of the drive motor due to locking of the wheels, etc.). Accordingly, by avoiding the rapid charge in the input to or the output from the energy storage device, it becomes possible to protect the energy storage device.

The power generation control unit may be configured to limit an output from the power generation device when input electric power to the energy storage device exceeds an input electric power threshold value, or to increase the output from the power generation device when output electric power from the energy storage device exceeds an output electric power threshold value.

According to the above system, when the input electric power to the energy storage device exceeds the input electric power threshold value, the output of the power generation device is limited. In this manner, the input electric power to the energy storage device is decreased, and overcharging of the energy storage device is avoided. Thus, it becomes possible to protect the energy storage device. Otherwise, when the output electric power from the energy storage device exceeds the output electric power threshold value, the output of the power generation device is increased. In this manner, the output electric power from the energy storage device is decreased, and overdischarging of the energy storage device is avoided. Thus, it becomes possible to protect the energy storage device.

The power generation device may include a fuel cell, and the power generation control unit may include a first converter provided for the fuel cell, and a first converter control unit configured to control the first converter. The electric power system may include a second converter provided for the energy storage device and a second converter control unit configured to control the second converter. When the input electric power to the energy storage device exceeds the input electric power threshold value, the first converter control unit may be configured to limit an output current of the fuel cell, and change an output current limit value of the fuel cell based on the input electric power threshold value of the energy storage device, or when the output electric power from the energy storage device exceeds the output electric power threshold value, the first converter control unit may be configured to increase the output current of the fuel cell, and change an output current limit value of the fuel cell based on the output electric power threshold value of the energy storage device.

In this manner, it becomes possible to impose a suitable limitation to the output current of the fuel cell in correspondence with the input electric power threshold value or the output electric power threshold value of the energy storage device.

The input electric power threshold value or the output electric power threshold value of the energy storage device may be determined based on a remaining capacity of the energy storage device or a temperature of the energy storage device. In this manner, it becomes possible to suitably set the input electric power threshold value or the output electric power threshold value of the energy storage device, and thus, impose a suitable limitation to the output current of the fuel cell as well.

The first converter control unit may be configured to correct outputs of the fuel cell based on a deviation between the input electric power and the input electric power threshold value of the energy storage device or a deviation between the output electric power and the output electric power threshold value of the energy storage device. In this manner, based on the deviation between the input electric power of the energy storage device and the input electric power threshold value of the energy storage device, or the deviation between the output electric power of the energy storage device and the output electric power threshold value of the energy storage device, it becomes possible to suitably correct the output of the fuel cell.

A load which is different from the drive motor may be connected to a power line connecting the energy storage device and the second converter, and the first converter control unit may be configured to estimate input electric power to the energy storage device or output electric power from the energy storage device based on primary electric power of the second converter. In this manner, it becomes possible to monitor the state of the energy storage device. Accordingly, it becomes possible to determine the design more freely, and excellent failsafe characteristics are achieved.

The first converter control unit may be configured to estimate the input electric power to the energy storage device or the output electric power from the energy storage device based on secondary electric power of the second converter. In this manner, it becomes possible to monitor the state of the energy storage device. Accordingly, it becomes possible to determine the design more freely, and excellent failsafe characteristics are achieved.

According to another aspect of the present invention, an electric power system according to the present invention includes a power generation device, an energy storage device, a drive motor driven by electric power from the power generation device and the energy storage device, a motor control unit configured to control an output from the drive motor, a power generation control unit configured to control a power generation amount of the power generation device, a parameter acquisition unit configured to obtain a parameter regarding an input to, or an output from the energy storage device, an electric power management unit provided separately from the motor control unit and the power generation control unit, a first signal system connecting the motor control unit and the electric power management unit, and a second signal system bypassing the electric power management unit and connecting the motor control unit and the parameter acquisition unit. In the electric power system, the motor control unit is configured to use an output command value of the drive motor obtained from the electric power management unit through the first signal system and the parameter obtained from the parameter acquisition unit through the second signal system to control the drive motor.

In the present invention, the motor control unit uses an output command value of the drive motor obtained from the electric power management unit through the first signal system and the parameter obtained from the parameter acquisition unit through the second signal system to control the drive motor. Therefore, for example, in the normal state, the output command value is used mainly, and if an instantaneous change occurs in parameters regarding inputs to, or outputs from the energy storage device (e.g., rapid increase in the output electric power from the energy storage device resulting from rapid increase in the power consumption of the drive motor due to skidding of the wheels, etc.), by focusing on the change of the parameters, etc., it becomes possible to control power generation of the power generation device. Therefore, it becomes possible to protect the energy storage device responsive to the rapid change in the input to, or output from the energy storage device.

DESCRIPTION OF EMBODIMENTS

A. First Embodiment

A1. Structure of First Embodiment (A1-1. Overall Structure)

Figure 1:
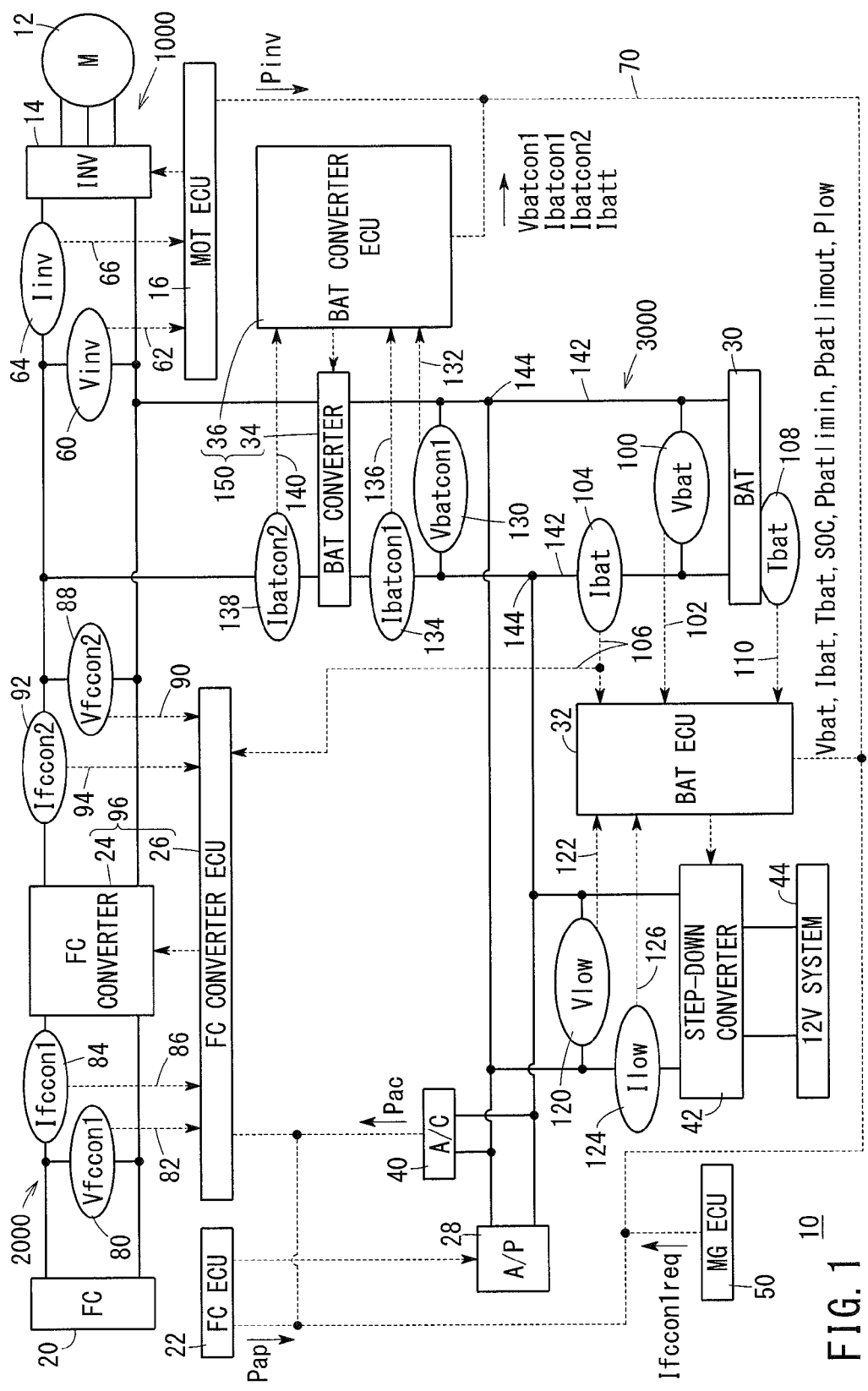
FIG. 1 is diagram schematically showing overall structure a fuel cell vehicle as an electric power system according to a first embodiment of the present invention.

FIG. 1 is a diagram schematically showing overall structure of a fuel cell vehicle 10 (hereinafter referred to as the "FC vehicle 10" or the "vehicle 10" as an electric power system according to a first embodiment of the present invention. The vehicle 10 has a drive system 1000 including a traction motor 12 (hereinafter referred to as the "motor 12" or the "drive motor 12"), an inverter 14, and a motor electronic control unit 16 (hereafter also referred to as the "motor ECU 16" or the "MOT ECU 16").

Further, the vehicle 10 has a FC system 2000 including a fuel cell stack 20 (hereinafter referred to as the "FC stack 20" or the "FC 20"), a fuel cell electronic control unit 22 (hereinafter referred to as the "FC ECU 22"), a fuel cell converter 24 (hereinafter referred to as the "FC converter 24"), an FC converter electronic control unit 26 (hereinafter referred to as the "FC converter ECU 26" or the "ECU 26"), and an air pump 28.

Further, the vehicle 10 has a battery system 3000 including a battery 30, a battery electronic control unit 32 (hereinafter referred to as the battery ECU 32" or the "BAT ECU 32"), a battery converter 34 (hereinafter referred to as the "BAT converter 34"), a battery converter electronic control unit 36 (hereinafter referred to as the "battery converter ECU 36" or "BAT converter ECU 36").

Further, the vehicle 10 includes an air conditioner 40, a step-down (voltage buck) converter 42, a 12V system 44, and a management electronic control unit 50 (hereinafter also referred to as the "management ECU 50" or the "MG ECU 50"). The air pump 28, the air conditioner 40, the step-down converter 42, and the 12V system 44 are auxiliary devices of the vehicle 10, and serve as parts of the load in the vehicle 10 as the electric power system.

(A1-2. Drive System 1000)

(A1-2-1. Traction Motor 12)

The motor 12 of the first embodiment is a three phase alternating current brushless motor. The motor 12 generates a driving force based on electric power supplied from the FC 20 and the battery 30, and rotates wheels (not shown) through a transmission (not shown) using this driving force. Further, the motor 12 outputs electric power produced by regeneration (regenerative electric power Preg) [W] to the battery 30, etc.

(A1-2-2. Inverter 14)

The inverter 14 has three-phase full bridge structure, and performs DC to AC conversion. More specifically, the inverter 14 converts the direct current into three-phase alternating current, and supplies the alternating current to the motor 12, and after AC to DC conversion as a result of regenerative operation, supplies the direct current to the battery 30, etc. through the battery converter 34. The motor 12 and the inverter 14 are main devices in the vehicle 10, and parts of the load in the vehicle 10 as an electric power system.

The input terminal voltage Vinv of the inverter 14 (hereinafter referred to as the "inverter voltage Vinv") is detected by a voltage sensor 60, and outputted to the motor ECU 16 through a signal line 62. The input terminal current Iinv of the inverter 14 (hereinafter referred to as the "inverter current Iinv") is detected by a current sensor 64, and outputted to the motor ECU 16 through a signal line 66.

(A1-2-3. Motor ECU 16)

The motor ECU 16 controls the motor 12 and the inverter 14 based on input values such as command values from the management ECU 50. Further, the motor ECU 16 outputs the inverter voltage Vinv, the inverter current Iinv, the inverter electric power Pinv, etc., to a communications network 70. The inverter electric power Pinv is input terminal electric power of the inverter 14 calculated by multiplying the inverter voltage Vinv by the inverter current Iinv. In the first embodiment, the communications network 70 is a CAN (controller area network). Hereinafter, the communications network 70 is also referred to as the CAN 70.

The motor ECU 16 includes input/output devices, computing devices, and storage devices (these devices are not shown). The other ECUs also include input/output devices, computing devices, and storage devices.

(A1-3. FC System 2000)

(A1-3-1. FC Stack 20)

For example, the FC stack 20 is formed by stacking a plurality of fuel cells each including an anode, a cathode, and a solid polymer electrolyte membrane interposed between the anode and the cathode. An anode system, a cathode system, a cooling system, etc. are provided around the FC stack 20. The anode system supplies a hydrogen (fuel gas) to the anode of the FC stack 20, and discharges the hydrogen from the anode of the FC stack 20. The cathode system supplies air containing oxygen (oxygen-containing gas) to the cathode of the FC stack 20, and discharges the air from the cathode of the FC stack 20. The cooling system cools the FC stack 20. In FIG. 1, the anode system, the cathode system, and the cooling system are not shown except the air pump 28 and the FC ECU 22.

(A1-3-2. FC ECU 22)

The FC ECU 22 controls the overall power generation by the FC 20 such as supply of the hydrogen and oxygen to the FC 20, based on input values such as command values from the management ECU 50. That is, the FC ECU 22 controls the anode system, the cathode system, and the cooling system. The FC ECU 22 transmits power consumption Pap [W] of the air pump 28 to the management ECU 50, the FC converter ECU 26, etc. through the CAN 70.

(A1-3-3. FC Converter 24)

The FC converter 24 is a chopper type step-up (voltage boost) voltage converter (DC/DC converter) for stepping up the output voltage of the FC 20 (hereinafter referred to as the "FC voltage Vfc", and supplying the stepped up voltage to the inverter 14. The FC converter 24 is provided between the FC 20 and the inverter 14. Stated otherwise, one terminal of the FC converter 24 is connected to the primary side where the FC 20 is present, and the other terminal of the FC converter 24 is connected to the secondary side as a node between the inverter 14 and the battery 30.

The primary voltage Vfccon1 of the FC converter 24 is detected by a voltage sensor 80, and outputted to the FC converter ECU 26 through a signal line 82. The primary current Ifccon1 of the FC converter 24 is detected by a current sensor 84, and outputted to the FC converter ECU 26 through a signal line 86. The secondary voltage Vfccon2 of the FC converter 24 is detected by a voltage sensor 88, and outputted to the FC converter ECU 26 through a signal line 90. The secondary current Ifccon2 of the FC converter 24 is detected by a current sensor 92, and outputted to the FC converter ECU 26 through a signal line 94.

(A1-3-4. FC Converter ECU 26)

The FC converter ECU 26 controls the FC 20 through the FC converter 24 based on input values such as command values from the management ECU 50. Hereinafter, the FC converter 24 and the FC converter ECU 26 will be referred to as the "FC VCU 96" as having a meaning of a voltage control unit for the FC 20.

Some of the input values to the FC converter ECU 26 are directly inputted to the FC converter ECU 26, and the other input values are inputted to the FC converter ECU 26 through the communications network 70. In the first embodiment, the input values directly inputted to the FC converter ECU 26 include input/output terminal current Ibat of the battery 30 detected by a current sensor 104 described later. Therefore, it becomes possible to protect the battery 30 (The detailed explanation will be given later.).

(A1-4. Battery System 3000)

(A1-4-1. Battery 30)

The battery 30 is an energy storage device including a plurality of battery cells. For example, a lithium ion secondary battery, a nickel-metal hydride (nickel hydrogen) secondary battery, etc. may be used. In the first embodiment, the lithium ion secondary battery is used. Instead of the battery 30, an energy storage device such as a capacitor may be used.

The input/output terminal voltage [V] of the battery 30 (hereinafter referred to as the "BAT terminal voltage Vbat" is detected by a voltage sensor 100, and outputted to the battery ECU 32 through a signal line 102. The input/output terminal current [A] of the battery 30 (hereinafter referred to as the "BAT terminal current Ibat" is detected by the current sensor 104, and outputted to the FC converter ECU 26 and the battery ECU 32 through a signal line 106. The temperature Tbat [° C.] of the battery 30 (hereinafter referred to as the "battery temperature Tbat" is detected by a temperature sensor 108, and outputted to the battery ECU 32 through a signal line 110.

(A1-4-2. Battery ECU 32)

The battery ECU 32 controls the battery 30 based on input values such as command values from the management ECU 50. The battery ECU 32 calculates a remaining capacity of the battery 30 (hereinafter referred to as the "SOC" or the "battery SOC") based on the BAT terminal voltage Vbat and the BAT terminal current Ibat for use of management of the battery 30.

For example, the battery ECU 32 calculates an input limit value Pbatlimin of the battery 30 (hereinafter also referred to as the "BAT terminal input limit value Pbatlimin") [W] and an output limit value Pbatlimout of the battery 30 (hereinafter also referred to as the "BAT terminal output limit value Pbatlimout") [W] based on the battery temperature Tbat and SOC. For example, the method of determining (or setting) the input limit value Pbatlimin and the output limit value Pbatlimout is carried out in the same manner as in the case of US 2008/0018111 A1 (see FIGS. 2 and 3 of US 2008/0018111 A1).

Further, the battery ECU 32 of the first embodiment controls the step-down converter 42 based on input values such as command values from the management ECU 50. The input terminal voltage [V] of the step-down converter 42 (hereinafter referred to as the "step-down converter terminal voltage Vlow") is detected by a voltage sensor 120, and outputted to the battery ECU 32 through a signal line 122. The input terminal current [A] of the step-down converter 42 (hereinafter referred to as the "step-down converter terminal current Ilow") is detected by a current sensor 124, and outputted to the battery ECU 32 through a signal line 126. The battery ECU 32 calculates step-down converter terminal electric power Plow [W] (hereinafter referred to as the "step-down converter power consumption Plow" or the "power consumption Plow") by multiplying the step-down converter terminal voltage Vlow by the step-down converter terminal current Ilow.

The battery ECU 32 sends the BAT terminal voltage Vbat, the BAT terminal current Ibat, the battery temperature Tbat, the battery SOC, the BAT terminal input limit value Pbatlimin, the BAT terminal output limit value Pbatlimout, and the step-down converter terminal electric power Plow to the MG ECU 50, the FC converter ECU 26, etc. through the CAN 70.

(A1-4-3. Battery Converter 34)

The BAT converter 34 is a chopper type step-up/down (voltage boost/buck) converter (DC/DC converter). That is, the BAT converter 34 steps up the output voltage of the battery 30 (BAT terminal voltage Vbat), and supplies the stepped up voltage to the inverter 14. Further, the BAT converter 34 steps down the regenerative voltage of the motor 12 (hereinafter referred to as the "regenerative voltage Vreg") or the secondary voltage Vfccon2 of the FC converter 24, and supplies the stepped down voltage to the battery 30.

The BAT converter 34 is provided between the battery 30 and the inverter 14. Stated otherwise, one terminal of the BAT converter 34 is connected to the primary side where the battery 30 is present, and the other terminal of the BAT converter 34 is connected to the secondary side as a node between the FC 20 and the inverter 14.

The primary voltage Vbatcon1 of the BAT converter 34 is detected by a voltage sensor 130, and outputted to the BAT converter ECU 36 through a signal line 132. The primary current Ibatcon1 of the BAT converter 34 is detected by a current sensor 134, and outputted to the BAT converter ECU 36 through a signal line 136. The secondary current Ibatcon2 of the BAT converter 34 is detected by a current sensor 138, and outputted to the BAT converter ECU 36 through a signal line 140.

It should be noted that the primary voltage Vbatcon1 is voltage on the BAT converter 34 side, from a node 144 for auxiliary devices, in a power line 142 connecting the battery 30 and the BAT converter 34. Likewise, the primary current Ibatcon1 is current on the BAT converter 34 side, from the node 144 for the auxiliary devices, in the power line 142 connecting the battery 30 and the BAT converter 34.

In the case where no auxiliary devices (air pump 28, etc.) are connected to the power line 142, one of the voltage sensors 100, 130 may be omitted, and one of the current sensors 104, 134 may be omitted.

(A1-4-4. Battery Converter ECU 36)

The BAT converter ECU 36 controls the BAT converter 34 based on input values such as command values from the management ECU 50. Hereinafter, the BAT converter 34 and the BAT converter ECU 36 will be referred to as the "BAT VCU 150" as having a meaning of a voltage control unit for the battery 30.

The BAT converter ECU 36 sends the primary voltage Vbatcon1, the primary current Ibatcon1, the secondary current Ibatcon2, and the passing current Ibatt to the MG ECU 50, the FC converter ECU 26, etc. through the CAN 70. The passing current Ibatt is current passing through the BAT converter 34. The BAT converter ECU 36 selects one of the primary Ibatcon1 and the secondary current Ibatcon2, outputted from the BAT converter 34 as the passing current Ibatt. For example, when the battery 30 is being charged, the primary current Ibatcon1 is the passing current Ibatt.

(A1-5. Auxiliary Devices)

As described above, in the first embodiment, the auxiliary devices include, for example, the air pump 28, the air conditioner 40, the step-down converter 42 (step down type DC-DC converter) and the 12V system 44. Additionally, a water pump (not shown) for circulating water as a coolant for cooling the FC 20, included in the cooling system of the FC system 2000 may also be an auxiliary device.

The air conditioner 40 regulates the temperature, etc. in the vehicle 10. The power consumption Pac [W] of the air conditioner 40 is transmitted from a control unit (not shown) of the air conditioner 40 to the MG ECU 50, the FC converter ECU 26, etc. through the CAN 70.

The step-down converter 42 steps down the voltage on the primary side of the BAT converter 34 (BAT VCU 150), and supplies the stepped down voltage to the 12V system 44. The 12V system 44 includes a 12V battery, accessories, a radiator fan, a head light, etc. (not shown). The accessories include devices such as an audio device and a navigation device. The radiator fan is a fan for cooling a coolant to be circulated by the water pump, in a radiator.

(A1-6. Management ECU 50)

The management ECU 50 sends command values to the MOT ECU 16, the FC ECU 22, the FC converter ECU 26, the BAT ECU 32, and the BAT converter ECU 36, etc. through the communications network 70 (FIG. 1). In this manner, the motor 12, the inverter 14, the FC 20, the FC converter 24, the battery 30, the BAT converter 34, and the auxiliary devices are controlled. In the control, the MG ECU 50 executes a program stored in a memory unit (not shown). Further, the MG ECU 50 uses detection values of various sensors such as the voltage sensors 60, 80, 88, 100, 120, 130, and the current sensors 64, 84, 92, 104, 124, 134, 138, etc.

In addition to the above sensors, the various sensors herein include an accelerator pedal operation amount sensor (hereinafter referred to as the "AP operation amount sensor"), a motor rotational number sensor, and a wheel velocity sensor (all of these sensors are not shown). The AP operation amount sensor detects the operation amount [%] of the accelerator pedal (not shown). The motor rotational number sensor detects the rotational number of the motor 12 (hereinafter referred to as the "motor rotation number Nmot" or "rotation number Nmot") [rpm]. The MG ECU 50 uses the rotational number Nmot to detect the vehicle velocity V [km/h] of the FC vehicle 10. The wheel velocity sensor detects the velocity of each wheel (wheel velocity), not shown.

The MG ECU 50 calculates the load required for the entire FC vehicle 10 (entire load), based on inputs from various switches and various sensors (load requirements) in addition to the state of the FC 20, the state of the battery 30, and the state of the motor 12. Further, the MG ECU 50 balances, and determines proportions (assignments) of the load (FC load) to be powered by the FC stack 20 and the load (battery load) to be powered by the battery 30, and the load (generation load) to be powered by the regenerative power source (motor 12). Based on these loads, the MG ECU 50 sends command values to the MOT ECU 16, the FC ECU 22, the FC converter ECU 26, the BAT ECU 32, the BAT converter ECU 36, etc.

The command values transmitted from the MG ECU 50 to the FC converter ECU 26 include a requirement value of primary current Ifccon1 of the FC converter 24 (hereinafter referred to as the "requirement primary current Ifccon1req"). The requirement primary current Ifccon1req can be understood as the requirement value of the output current of the FC 20. Stated otherwise, the requirement primary current Ifccon1req is a load to be powered by the FC 20 (i.e., the target output of the FC 20).

A2. Control of First Embodiment

Next, mainly, control (FC converter control) of the FC converter 24 by the FC converter ECU 26 will be explained.
(A2-1. Summary of FC Converter Control)

Figure 2:
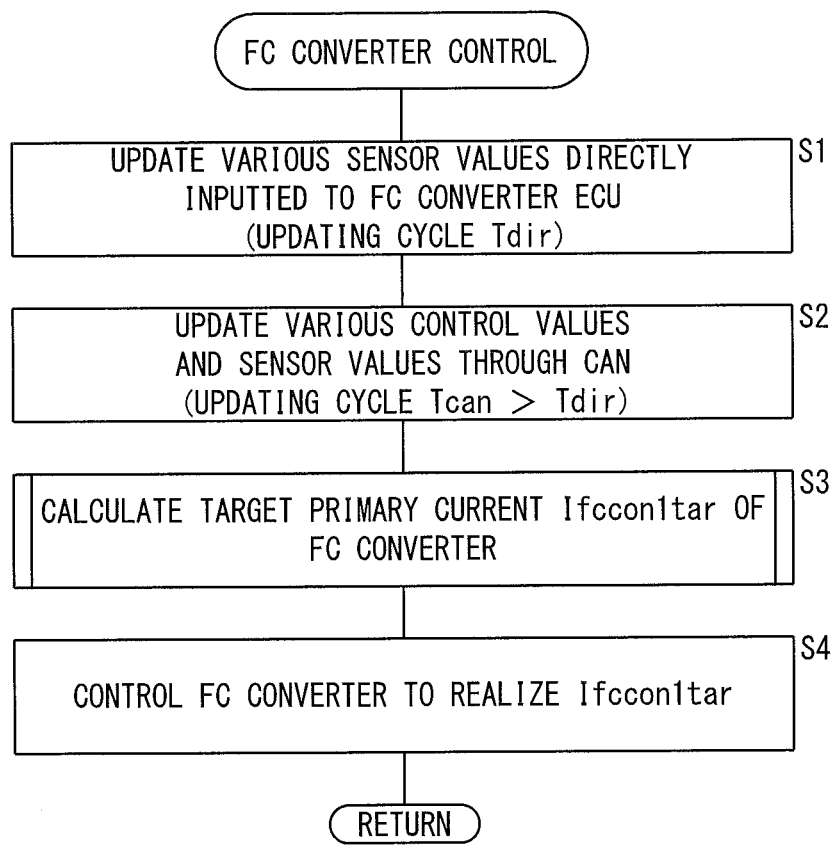
FIG. 2 is a flow chart for controlling an FC converter by an FC converter electronic control unit in the first embodiment.

FIG. 2 shows a flow chart for controlling the FC converter 24 (FC converter control) by the FC converter ECU 26, in the first embodiment. In step S1, the FC converter ECU 26 updates various sensor values Mdir directly inputted to the FC converter ECU 26.

The various sensor values Mdir herein include the FC converter primary voltage Vfccon1 from the voltage sensor 80, the FC converter primary current Ifccon1 from the current sensor 84, and the FC converter secondary voltage Vfccon2 from the voltage sensor 88. Further, in the first embodiment, the current sensor 104 is directly connected to the FC converter ECU 26 (FIG. 1). Therefore, the BAT terminal current Ibat is also included in the sensor values Mdir.

The updating cycle Tdir of these sensor values Mdir is, e.g., several msec. The updating cycle Tdir may vary for each of the sensor values Mdir.

In step S2, the FC converter ECU 26 updates various control values Ccan and sensor values Mcan inputted through the CAN 70. The control values Ccan herein include the requirement primary current Ifccon1req of the FC converter 24 and the input limit value Pbatlimin and the output limit value Pbatlimout of the battery 30. Further, the sensor values Mcan herein include the inverter electric power Pinv, the air conditioner power consumption Pac, the air pump power consumption Pap, the stepped down converter power consumption Plow, the BAT terminal voltage Vbat, the primary voltage Vbatcon1, the primary current Ibatcon1, the secondary current Ibatcon2, and the passing current Ibatt of the BAT converter 34.

The updating cycle Tcan of these control values Ccan and the sensor values Mcan is, e.g., several tens of msec. The updating cycle Tcan is longer than the updating cycle Tdir of step S1. The updating cycle Tdir may vary for each of the control values Ccan or the sensor values Mcan. The computation cycle (hereinafter referred to as the "control cycle Tc") of the steps S1 to S4 in FIG. 2 in the first embodiment is, e.g., several msec. The control cycle Tc is equal to the updating cycle Tdir of the sensor values Mdir. For example, it may be possible to use the control cycle Tc which is shorter than the updating cycle Tdir or longer than the updating cycle Tdir, from the viewpoint of making the updating cycle Tdir and the control cycle Tc shorter than the updating cycle Tcan.

In step S3, the FC converter ECU 26 calculates the target primary current Ifccon1tar of the FC converter 24 based on the control values Ccan and the sensor values Mdir, Mcan (Detailed explanation will be given later with reference to FIGS. 3 to 6.).

In step S4, the ECU 26 controls the FC converter 24 for realizing the target primary current Ifccon1tar calculated in step S3. Specifically, in the case where the primary current Ifccon1 is smaller than the target primary current Ifccon1tar, the drive duty ratio for the FC converter 24 is increased. In the case where the primary current Ifccon1 is larger than the target primary current Ifccon1tar, the drive duty ratio for the FC converter 24 is decreased. In the case where the primary current Ifccon1 is equal to the target primary current Ifccon1tar, the present drive duty ratio for the FC converter 24 is maintained.

(A2-2. Calculation of the Target Primary Current Ifccon1tar of the FC Converter 24 (S3 of FIG. 2))
(A2-2-1. Overall Flow of Calculation of the Target Primary Current Ifccon1tar)

Figure 3:
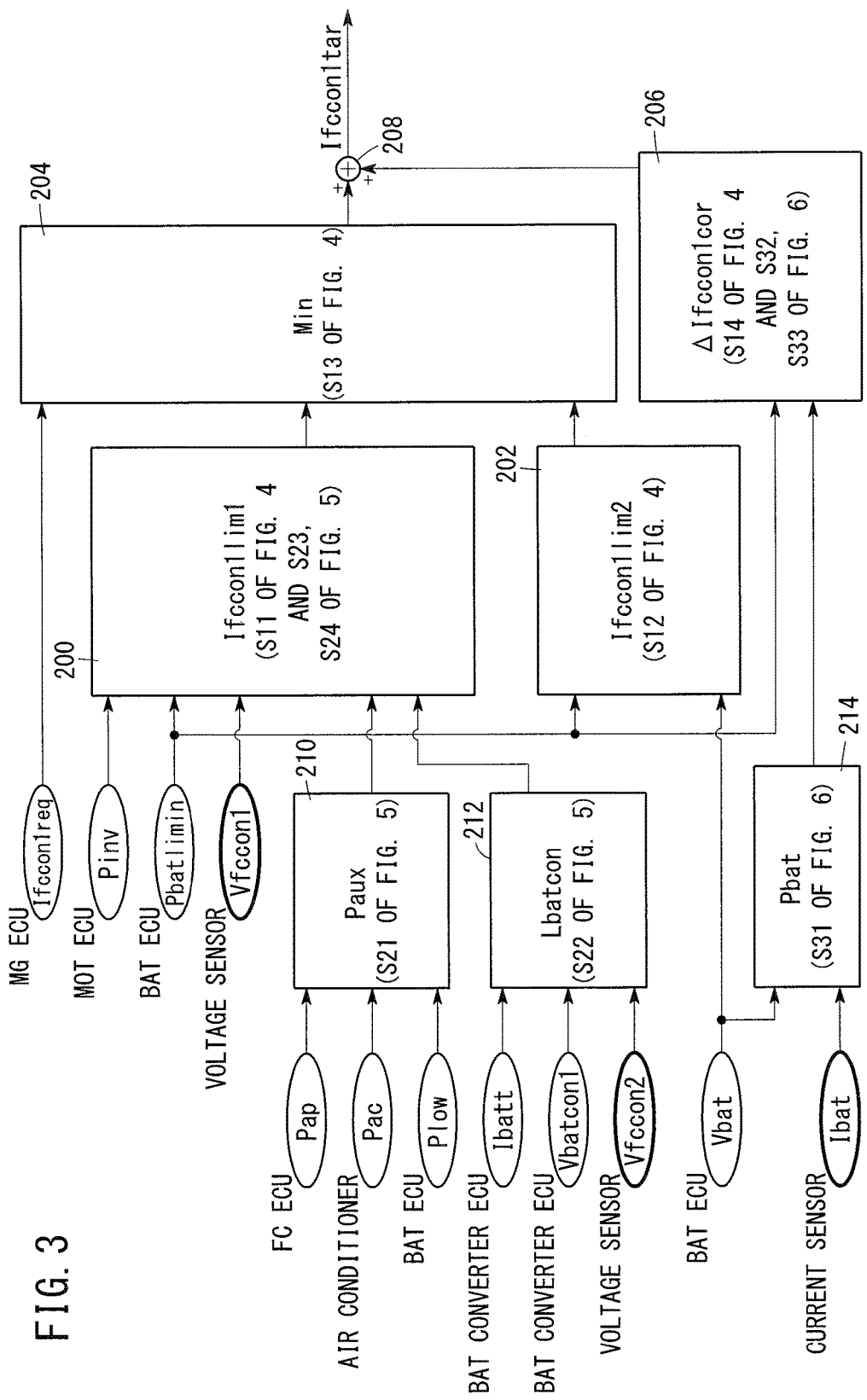
FIG. 3 is a diagram illustrating calculation of target primary current of the FC converter in the first embodiment.
Figure 4:
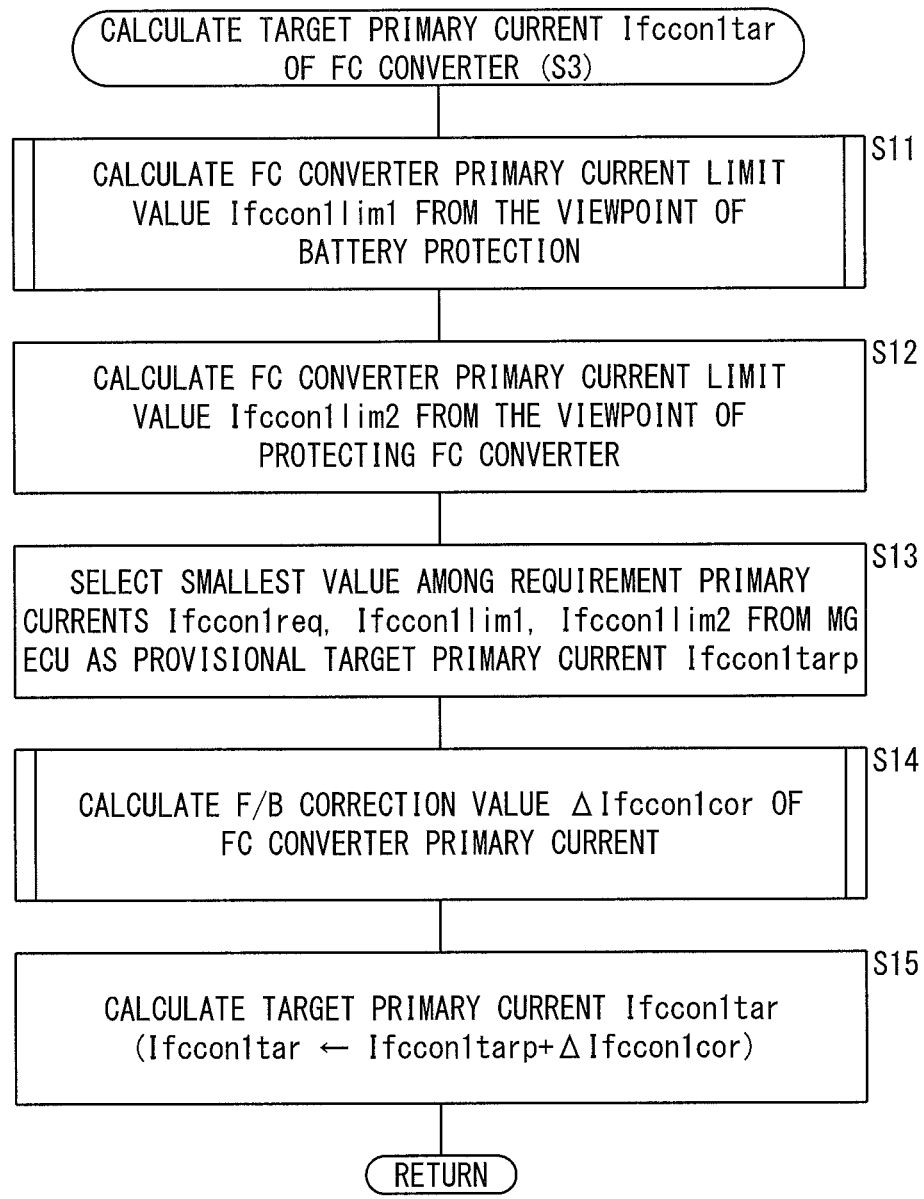
FIG. 4 is a flow chart (details of S3 in FIG. 2) for calculating the target primary current of the FC converter, in the first embodiment.

FIG. 3 is a diagram illustrating calculation of the target primary current Ifccon1tar of the FC converter 24 in the first embodiment. FIG. 4 is a flow chart for calculating the target primary current Ifccon1tar of the FC converter 24 (details of S3 of FIG. 2), in the first embodiment. Each of FIGS. 3 and 4 shows the procedure at the time of charging the battery 30.

In FIG. 3, items in ovals denote the control values Ccan or the sensor values Mdir, Mcan. In particular, the items in bold ovals are the sensor values Mdir (values directly inputted to the FC converter ECU 26). The items in non-bold ovals denote the control values Ccan or the sensor values Mcan (values inputted to the FC converter ECU 26 through the CAN 70). Further, the items in blocks 200, 202, 204, 206, 210, 212, 214 in FIG. 3 (hereinafter referred to as the "computation blocks 200, 202, 204, 206, 210, 212, 214" or the blocks 200, 202, 204, 206, 210, 212, 214"), and an adder 208 show processes in the FC converter ECU 26.

In the computation block 200 of FIG. 3 (step S11 of FIG. 4), the FC converter ECU 26 calculates the primary current limit value Ifccon1lim1 of the FC converter 24 from the viewpoint of protecting the battery 30. The detailed explanation will be given later with reference to FIG. 5.

In the computation block 202 of FIG. 3 (step S12 of FIG. 4), the FC converter ECU 26 calculates the primary current limit value Ifccon1lim2 of the FC converter 24 from the viewpoint of protecting the FC converter 24, based on the input limit value Pbatlimin and the BAT terminal voltage Vbat of the battery 30. For example, the ECU 26 calculates the primary current limit value Ifccon1lim2 by dividing the input limit value Pbatlimin by the BAT terminal voltage Vbat.

In the computation block 204 of FIG. 3 (step S13 of FIG. 4), the ECU 26 selects the smallest value among the requirement primary current Ifccon1req from the MG ECU 50 and the primary current limit values Ifccon1lim1, Ifccon1lim1 calculated in the computation blocks 200, 202 (steps S11, S12) as a provisional target primary current Ifccon1tarp. Therefore, the requirement primary current Ifccon1req is limited by this selection.

In the computation block 206 of FIG. 3 (step S14 of FIG. 4), the ECU 26 calculates a feedback correction value ΔIfccon1cor of the primary current Ifccon1 of the FC converter 24 (hereinafter referred to as the "F/B correction value ΔIfccon1cor"). The detailed explanation will be given later with reference to FIG. 6.

In the adder 208 of FIG. 3 (step S15 of FIG. 4), the FC converter ECU 26 calculates a target primary current Ifccon1tar by adding the F/B correction value ΔIfccon1cor calculated in the computation block 206 (S14 of FIG. 4) to the provisional target primary current Ifccon1tarp calculated in the computation block 204 (S13 of FIG. 4).
(A2-2-2. Calculation of Primary Current Limit Value Ifccon1lim1)

Figure 5:
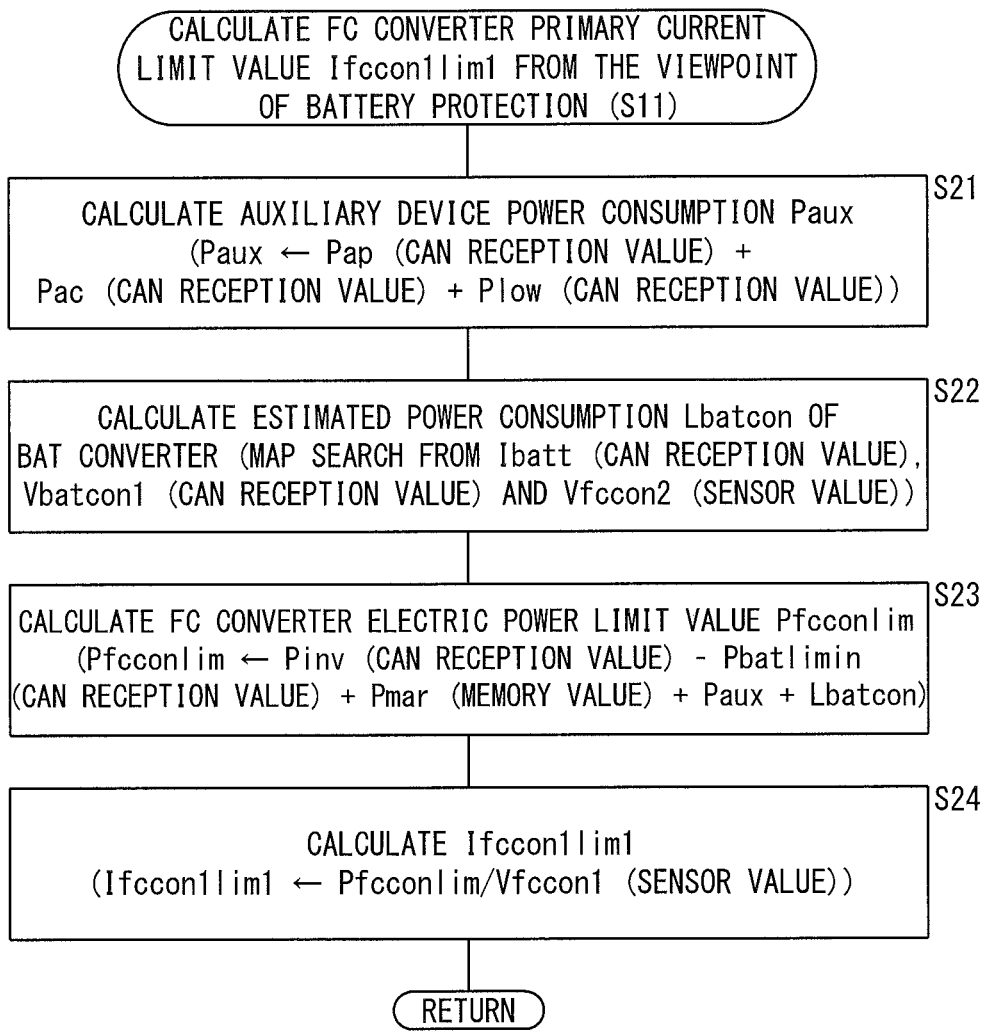
FIG. 5 is a flow chart (details of S11 in FIG. 4) for calculating a primary current limit value of the FC converter from a viewpoint of protecting a battery, in the first embodiment.

FIG. 5 is a flow chart (details of S11 in FIG. 4) for calculating a primary current limit value Ifccon1lim1 of the FC converter 24 from a viewpoint of protecting the battery 30, in the first embodiment. In step S21 of FIG. 5 (computation block 210 of FIG. 3), the FC converter ECU 26 adds up the air pump power consumption Pap, the air conditioner power consumption Pac, and the power consumption Plow of the step-down converter 42 to calculate the auxiliary device power consumption Paux. All of the power consumption Pap, the power consumption Pac, and the power consumption Plow are sensor values Mcan obtained by the FC converter 24 through the CAN 70.

In step S22 of FIG. 5 (computation block 212 of FIG. 3), the ECU 26 calculates the estimated power consumption Lbatcon of the BAT converter 34 based on the passing current Ibatt and the primary voltage Vbatcon1 of the BAT converter 34, and the secondary voltage Vfccon2 of the FC converter 24. Specifically, a map defining the relationship between the estimated power consumption Lbatcon and the combination of the passing current Ibatt, the primary voltage Vbatcon1, and the secondary voltage Vfccon2 is stored in a memory unit of the FC converter ECU 26 beforehand. Further, the FC converter ECU 26 identifies the estimated power consumption Lbatcon based on the combination of the passing current Ibatt, the primary voltage Vbatcon1, and the secondary voltage Vfccon2.

The passing current Ibatt and the primary voltage Vbatcon1 are sensor values Mcan obtained through the CAN 70. The secondary voltage Vfccon2 is a sensor value Mdir obtained by the FC converter ECU 26 directly from the voltage sensor 88. Therefore, at the time of repeating the steps S21 to S24 in FIG. 5, the passing current Ibatt and the primary voltage Vbatcon1 are updated at the updating cycle Tcan, and the secondary voltage Vfccon2 is updated at the control cycle Tc (=updating cycle Tdir<Tcan).

In step S23 of FIG. 5 (computation block 200 of FIG. 3), the FC converter ECU 26 subtracts the BAT terminal input limit value Pbatlimin from the inverter electric power Pinv, and adds a control margin Pmar, the auxiliary power consumption Paux and the estimated power consumption Lbatcon to the inverter electric power Pinv to calculate an electric power limit value Pfccon1lim of the FC converter 24. The inverter electric power Pinv and the BAT terminal input limit value Pbatlimin are the sensor value Mcan and control value Ccan obtained by the FC converter 24 through the CAN 70. The control margin Pmar is a memory value stored in the memory unit of the FC converter ECU 26. The estimated power consumption Lbatcon is a value calculated in the computation block 212 (S22 in FIG. 5).

In step S24 of FIG. 5 (computation block 200 of FIG. 3), the FC converter ECU 26 divides the electric power limit value Pfccon1lim calculated in step S23 by the primary voltage Vfccon1 of the FC converter 24 to calculate the primary current limit value Ifccon1lim1. The primary voltage Vfccon1 is a sensor value Mdir obtained by the FC converter ECU 26 directly from the voltage sensor 80.

(A2-2-3. Calculation of the F/B Correction Value ΔIfccon1cor)

Figure 6:
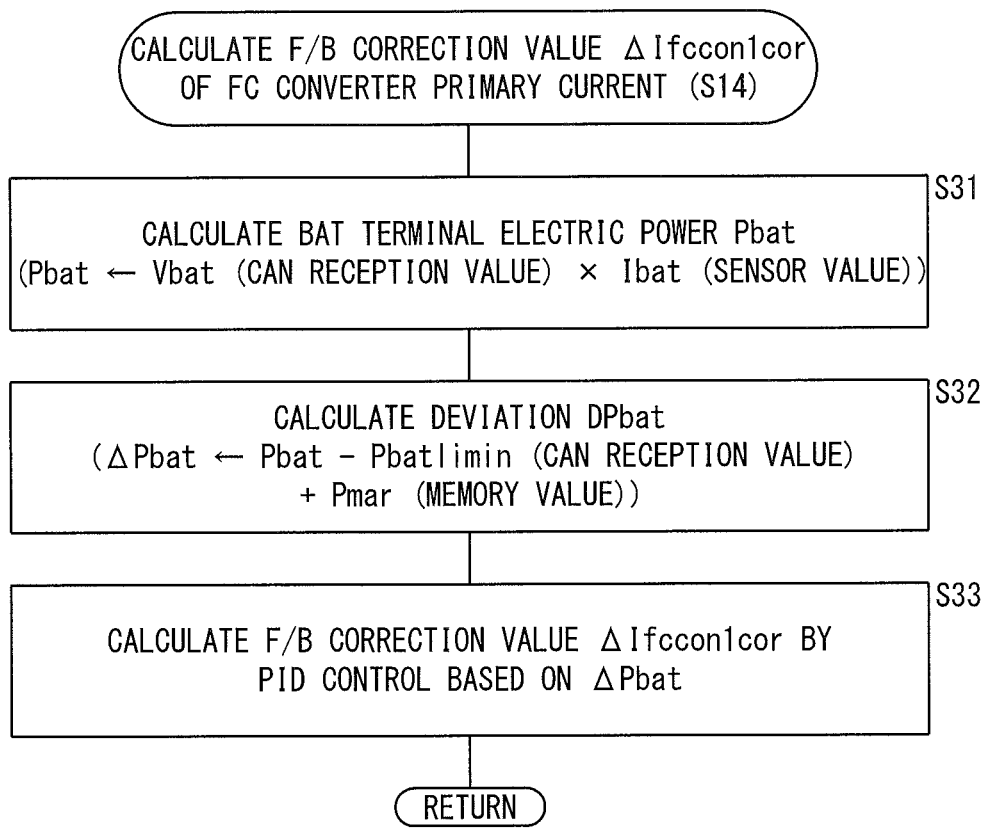
FIG. 6 is a flow chart (details of S14 of FIG. 4) for calculating a feedback correction value of primary current of the FC converter, in the first embodiment.

FIG. 6 is a flow chart (details of S14 of FIG. 4) for calculating a F/B correction value ΔIfccon1cor of the primary current Ifccon1 of the FC converter 24, in the first embodiment. In step S31 of FIG. 6 (computation block 214 of FIG. 3), the FC converter ECU 26 multiplies the BAT terminal voltage Vbat by the BAT terminal current Ibat to calculate the BAT terminal electric power Pbat.

As described above, in the first embodiment, the BAT terminal voltage Vbat from the voltage sensor 100 is inputted to the FC converter ECU 26 through the CAN 70, and the BAT terminal current Ibat from the current sensor 104 is directly inputted to the FC converter ECU 26 (FIG. 1). Therefore, the BAT terminal voltage Vbat is a sensor value Mcan obtained by the FC converter ECU 26 through the CAN 70, and the BAT terminal current Ibat is a sensor value Mdir obtained by the FC converter ECU 26 directly from the current sensor 104. Therefore, the BAT terminal voltage Vbat is updated at the updating cycle Tcan, and the BAT terminal current Ibat is updated at the updating cycle Tdir (<Tcan).

In step S32 of FIG. 6 (computation block 206 of FIG. 3), the FC converter ECU 26 subtracts the BAT terminal input limit value Pbatlimin from the BAT terminal electric power Pbat, and adds the control margin Pmar to the BAT terminal electric power Pbat, to calculate a deviation ΔPbat. The BAT terminal electric power Pbat is computed in the computation block 214 (S31 of FIG. 6). The BAT terminal input limit value Pbatlimin is a sensor value Mcan obtained by the FC converter 24 through the CAN 70. Further, the control margin Pmar is a memory value stored in the memory unit of the FC converter ECU 26. Since the BAT terminal electric power Pbat is computed at the control cycle Tc (<updating cycle Tcan), the deviation ΔPbat is also computed at the control cycle Tc (<updating cycle Tcan).

In step S33 of FIG. 6 (computation block 206 in FIG. 3), the FC converter ECU 26 implements PID control (PID: Proportional Integral Derivative) based on the deviation ΔPbat calculated in step S32 to calculates the F/B correction value ΔIfccon1cor.

A3. Advantages of First Embodiment

As described above, in the first embodiment, the FC converter ECU 26 (part of power generation control unit) uses the requirement primary current Ifccon1req (power generation command value of the FC 20 (power generation device)) obtained from the MG ECU 50 (power generation management unit) through the CAN 70 (first signal system) and the BAT terminal current Ibat (parameter) obtained from the current sensor 104 (parameter acquisition unit) through the signal line 106 (second signal system) (FIG. 1) to control the FC 20. Therefore, for example, in the normal state, the requirement primary current Ifccon1req is used mainly, and if an instantaneous change occurs in the BAT terminal current Ibat, etc. regarding inputs to, or outputs from the battery 30 (energy storage device) (e.g., rapid increase in the input electric power to the battery 30 resulting from rapid decrease in the power consumption of the drive motor 12 due to locking of the wheels, etc.), by focusing on the change of the BAT terminal current Ibat, etc., it becomes possible to control power generation of the battery 30. Therefore, it becomes possible to protect the battery 30 responsive to the rapid change in the input to, or output from the battery 30.

In the first embodiment, the FC converter ECU 26 (part of the power generation control unit) corrects the requirement primary current Ifccon1req (power generation command value of the FC 20 (power generation device)) obtained from the MG ECU 50 (power management unit) through the CAN 70 (first signal system) using the BAT terminal current Ibat (parameter) (FIG. 1) obtained from the current sensor 104 (parameter acquisition unit) through the signal line 106 (second signal system) to control the FC 20 (power generation device (FIGS. 3 and 6, etc.). In this manner, it becomes possible to protect the battery 30 by avoiding the rapid change in the input to or the output from the battery 30 (energy storage device).

For example, a rapid increase in the input electric power to the battery 30 (energy storage device) resulting from a rapid decrease in the power consumption of the drive motor 12 by locking of the wheels may be regarded as a cause of the change in the instantaneous change in the BAT terminal current Ibat. Additionally, changes in the output of the air pump 28 and ripple noises may be the causes the instantaneous change in the BAT terminal current Ibat.

In the first embodiment, the FC converter ECU 26 (part of the power generation control unit) obtains the requirement primary current Ifccon1req from the MG ECU 50 (power management unit) through the CAN 70 (first signal system) at the updating cycle Tcan (first cycle) (S2 of FIG. 2). Further, the ECU 26 obtains the BAT terminal current Ibat (parameter) from the current sensor 104 (parameter acquisition unit) through the signal line 106 (second signal system) at the updating cycle Tdir (second cycle) which is shorter than the updating cycle Tcan (S1 of FIG. 2). Then, the ECU 26 implements control of the FC 20 using the requirement primary current Ifccon1req (target primary current Ifccon1tar) corrected using the BAT terminal current Ibat, etc., at the control cycle Tc (third cycle) which is shorter than the updating cycle Tcan.

In the first embodiment as described above, the FC converter ECU 26 corrects the requirement primary current Ifccon1req obtained from the MG ECU 50 through the CAN 70 using the BAT terminal current Ibat, etc. obtained directly from the current sensor 104 through the signal line 106 to control the FC 20 (FIGS. 6 and 3, etc.). Further, the updating cycle Tdir for obtaining the BAT terminal current Ibat and the control cycle Tc (third cycle) of the FC 20 are shorter than the updating cycle Tcan for obtaining the requirement primary current Ifccon1req. Therefore, it becomes possible to control power generation of the battery 30 responsive to the instantaneous change in the BAT terminal current Ibat (e.g., rapid increase in the input electric power to the battery 30 resulting from rapid decrease in the power consumption of the drive motor 12 due to locking of the wheels, etc.). Therefore, by avoiding the rapid charge in the input to or the output from the battery 30, it becomes possible to protect the battery 30.

In the first embodiment, when the requirement primary current Ifccon1req obtained from the MG ECU 50 exceeds the primary current limit value Ifccon1lim1 or Ifccon1lim2, the FC converter ECU 26 (part of the power generation control unit) selects the primary current control value Ifccon1lim1 or Ifccon1lim2 as the target primary current Ifccon1tar (block 204 in FIG. 3 and S13 in FIG. 4). Stated otherwise, when the input electric power to the battery 30 (energy storage device) exceeds the input electric power threshold value, the FC converter ECU 26 limits the output of the FC 20. In this manner, the input electric power to the battery 30 is decreased, and overcharging of the battery 30 is avoided. Thus, it becomes possible to protect the battery 30.

In the first embodiment, the FC VCU 96 (power generation control unit) includes the FC converter 24 (first converter) on the FC 20 side, and the FC converter ECU 26 (first converter control unit) for controlling the FC converter 24 (FIG. 1). Further, the vehicle 10 (power system) includes the BAT converter 34 (second converter) on the battery 30 (energy storage device) side, and the BAT converter ECU 36 (second converter control unit) for controlling the BAT converter 34 (FIG. 1).

Further, when the requirement primary current Ifccon1req obtained from the MG ECU 50 exceeds the primary current limit value Ifccon1lim1 (or Ifccon1lim2), the FC converter ECU 26 selects the primary current limit value Ifccon1lim1 (or Ifccon1lim2) as the target primary current Ifccon1tar (block 204 in FIG. 3, S13 in FIG. 4). Stated otherwise, when the input electric power to the battery 30 exceeds the input electric power threshold value, the FC converter ECU 26 limits the output current of the FC 20, and changes the primary current limit value Ifccon1lim1 (or Ifccon1lim2) (output current limit value) of the FC converter 24 (FIG. 5) based on the input electric power threshold value of the battery 30. In this manner, it becomes possible to impose a suitable limitation to the output current of the FC 20 in correspondence with the input electric power threshold value of the battery 30.

In the first embodiment, the primary current limit value Ifccon1lim2 of the FC converter 24 (input electric power threshold value of the battery 30 (energy storage device) is determined based on the battery temperature Tbat and SOC. Thus, it becomes possible to suitably determine the primary current limit value Ifccon1lim2, and moreover, impose a suitable limitation to the output current of the FC 20.

In the first embodiment, the FC converter ECU 26 (first converter control unit) corrects the output of the FC 20 based on the deviation ΔPbat between the BAT terminal electric power Pbat (input electric power of the energy storage device) and the BAT terminal input limit value Pbatlimin (input electric power threshold value) (FIGS. 6, 3, etc.). Thus, based on the deviation ΔPbat, it becomes possible to suitably correct the output of the FC 20.

B. Second Embodiment

B1. Structure of the Second Embodiment (Difference from First Embodiment)

Figure 7:
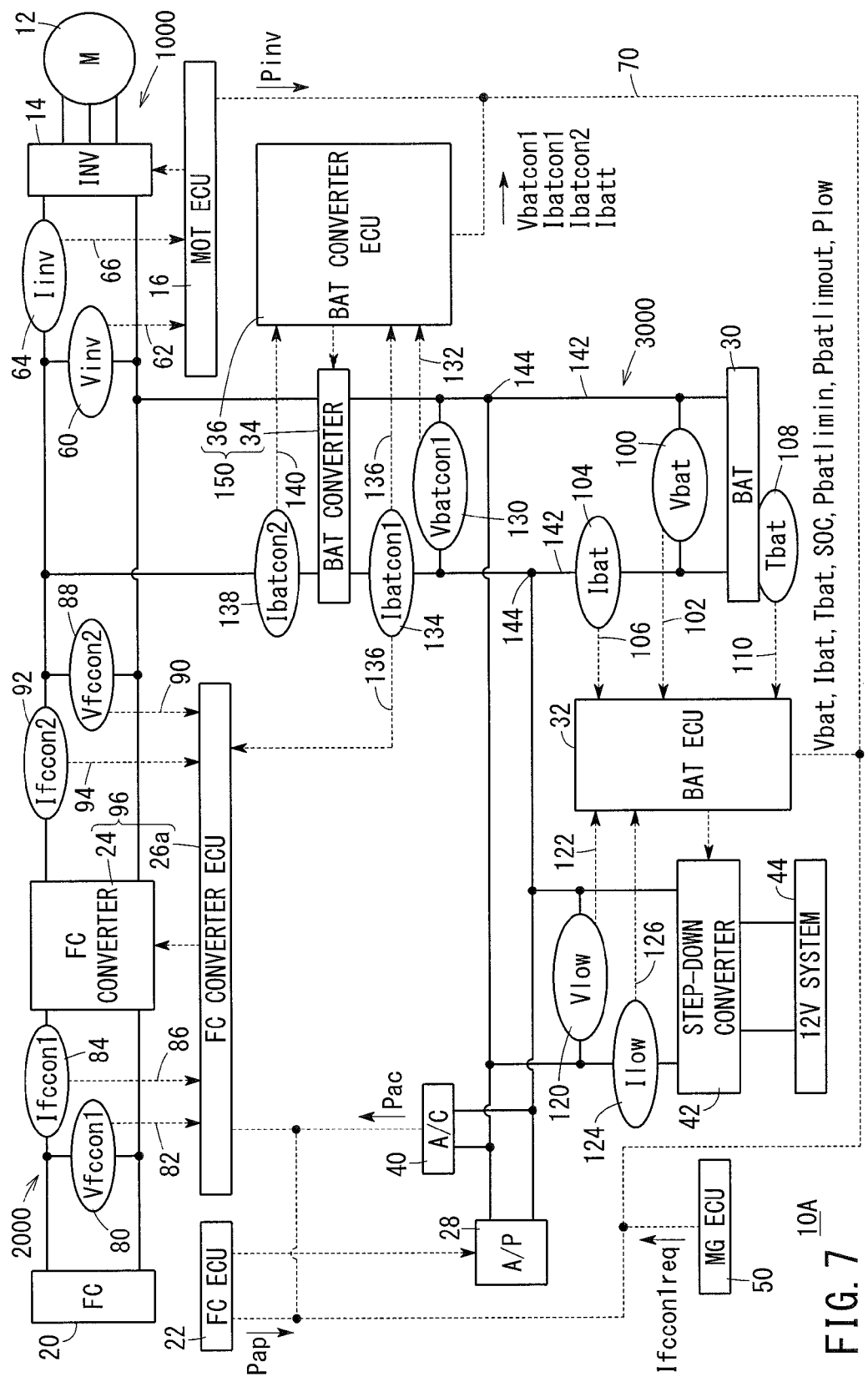
FIG. 7 is a diagram schematically showing overall structure of a fuel cell vehicle as an electric power system according to a second embodiment of the present invention.

FIG. 7 is a diagram schematically showing overall structure of a fuel cell vehicle 10A (hereinafter referred to as the "FC vehicle 10A" or the "vehicle 10A") as an electric power system according to a second embodiment of the present invention. The constituent elements that are identical to those of the first embodiment are labeled with the same reference numerals, and description thereof will be omitted.

In the vehicle 10 of the first embodiment, the current sensor 104 is connected to the FC converter ECU 26 through the signal line 106, and the BAT terminal current Ibat is directly inputted to the ECU 26 (FIG. 1). In contrast, in the vehicle 10A of the second embodiment, the current sensor 134 is connected to the FC converter electronic control unit 26a (hereinafter referred to as the "FC converter ECU 26a" or the "ECU 26a") through the signal line 136, and the primary current Ibatcon1 of the BAT converter 34 is directly inputted to the ECU 26a (FIG. 7).

Further, in the FC converter ECU 26 of the first embodiment, the BAT terminal electric power Pbat calculated based on the BAT terminal voltage Vbat and the BAT terminal current Ibat is used (computation block 214 in FIG. 3 and S31 of FIG. 6). In contrast, in the FC converter ECU 26a of the second embodiment, estimated BAT terminal electric power Pbatest estimated based on the primary voltage Vbatcon1 and the primary current Ibatcon1, etc. of the BAT converter 34 is used (computation block 214a of FIG. 8 and S43 of FIG. 9).

B2. Control of Second Embodiment (B2-1. Summary of FC Converter Control)

The summary of the control (FC converter control) of the FC converter 24 by the FC converter ECU 26a in the second embodiment is the same as that of the first embodiment (FIG. 2).

However, as described above, in the second embodiment, the current sensor 134 is connected to the FC converter ECU 26a through the signal line 136, and the primary current Ibatcon1 of the BAT converter 34 is directly inputted to the ECU 26a (FIG. 7). Therefore, in the case of the second embodiment, the various sensor values Mdir directly inputted to the ECU 26a in step S1 of FIG. 2 include the primary current Ibatcon1, and do not include the BAT terminal current Ibat. Further, the various sensor values Mcan directly inputted to the ECU 26a through the CAN 70 in step S2 of FIG. 2 include the BAT terminal current Ibat, and do not include primary current Ibatcon1.

Also in the second embodiment, the updating cycle Tdir in step S1 of FIG. 2 is shorter than the updating cycle Tcan in step S2.

(B2-2. Calculation of Target Primary Current Ifccon1tar of the FC Converter 24 (S3 of FIG. 2))

(B2-2-1. Overall Flow of Calculation of Target Primary Current Ifccon1tar)

Figure 8:
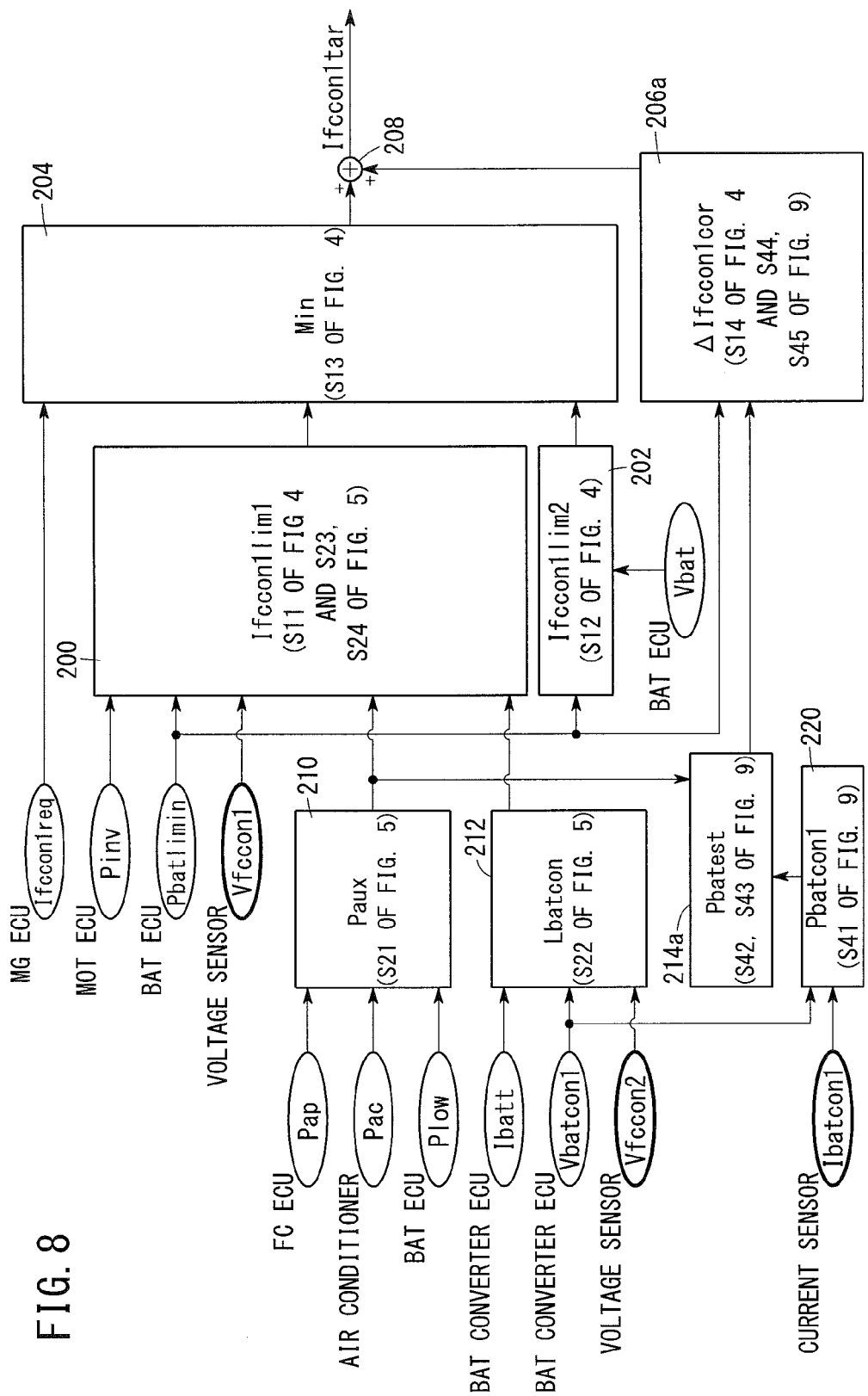
FIG. 8 is a diagram illustrating calculation of target primary current of the FC converter in the second embodiment.

FIG. 8 is a view showing calculation of the target primary current Ifccon1tar of the FC converter 24 according to the second embodiment. The summary of the flow chart (details of S3 of FIG. 2) for calculating the target primary current Ifccon1tar of the FC converter 24 is the same as that of the first embodiment (FIG. 4). Further, the summary of calculation of the primary current limit value Ifccon1lim1 of the FC converter 24 (S11 of FIG. 4) from the viewpoint of protecting the battery 30 is the same as that of the first embodiment (FIG. 5). As for the difference between FIG. 3 of the first embodiment and FIG. 8 of the second embodiment, explanation will be given later with reference to FIG. 9.

(B2-2-2. Calculation of F/B Correction Value ΔIfccon1cor)

Figure 9:
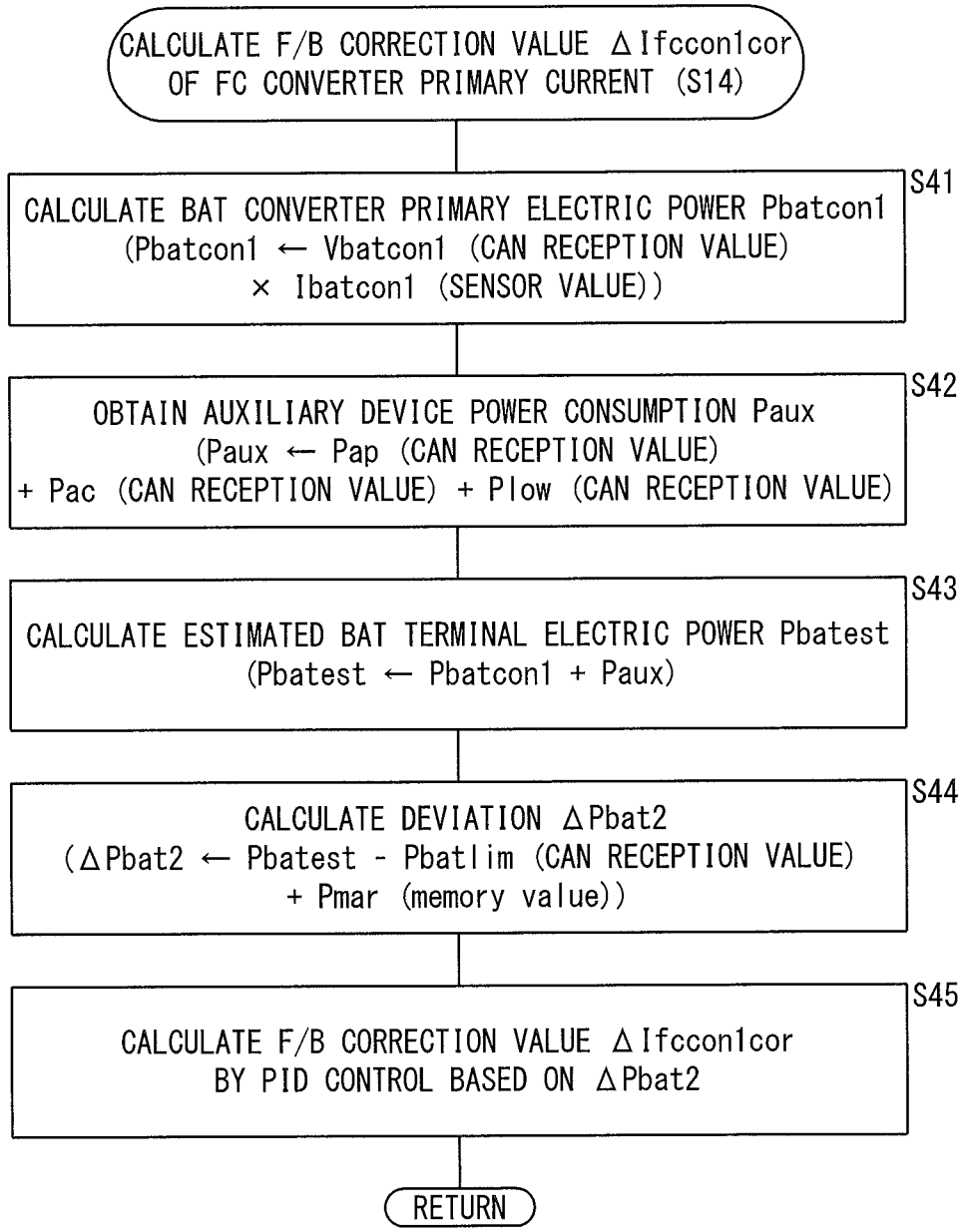
FIG. 9 is a flow chart (details of S14 of FIG. 4) for calculating a feedback correction value of primary current of the FC converter, in the second embodiment.

FIG. 9 is a flow chart for calculating an F/B correction value ΔIfccon1cor of the Ifccon1 of the FC converter 24 (details of S14 of FIG. 4) in the second embodiment. In step S41 of FIG. 9 (computation block 220 of FIG. 8), the FC converter ECU 26a multiplies the primary voltage Vbatcon1 of the BAT converter 34 by the primary current Ibatcon1 of the BAT converter 34 to calculate the primary electric power Pbatcon1.

As described above, in the second embodiment, the primary voltage Vbatcon1 from the voltage sensor 130 is inputted to the ECU 26a through the CAN 70, and the primary current Ibatcon1 from the current sensor 134 is directly inputted to the ECU 26a (FIG. 7). Therefore, the primary voltage Vbatcon1 is a sensor value Mcan obtained by the ECU 26a through the CAN 70, and the primary current Ibatcon1 is a sensor value Mdir obtained by the ECU 26a directly from the current sensor 134. Thus, the primary voltage Vbatcon1 is updated at the updating cycle Tcan, and the primary current Ibatcon1 is updated at the updating cycle Tdir (<Tcan).

In step S42 of FIG. 9 (computation block 214a of FIG. 8), the FC converter ECU 26a obtains the auxiliary device power consumption Paux calculated in step S21 of FIG. 5 (computation block 210 of FIG. 8).

In step S43 (computation block 214a of FIG. 8), the ECU 26a adds up the primary electric power Pbatcon1 of the BAT converter 34 and the auxiliary device power consumption Paux to calculate the estimated BAT terminal electric power Pbatest.

In step S44 (computation block 206a of FIG. 8) of FIG. 9, the FC converter ECU 26a subtracts the BAT terminal input limit value Pbatlimin from the estimated BAT terminal electric power Pbatest, and then, add a control margin Pmar to the estimated BAT terminal electric power Pbatest, to calculate the deviation ΔPbat2. The estimated BAT terminal electric power Pbatest is computed in the computation block 214a (S43 of FIG. 9). The BAT terminal input limit value Pbatlimin is a sensor value Mcan obtained by the FC converter 24 through the CAN 70. Further, the control margin Pmar is a memory value stored in the memory unit of the FC converter ECU 26a. Since the estimated BAT terminal electric power Pbatest is computed by the control cycle Tc (<updating cycle Tcan), the deviation ΔPbat2 is also computed by the control cycle Tc (<updating cycle Tcan).

In step S45 of FIG. 9 (computation block 206a of FIG. 8), the FC converter ECU 26a implements PID control based on the deviation ΔPbat2 calculated in step S44 to calculate the F/B correction value ΔIfccon1cor.

B3. Second Embodiment and Comparative Example

Figure 10:
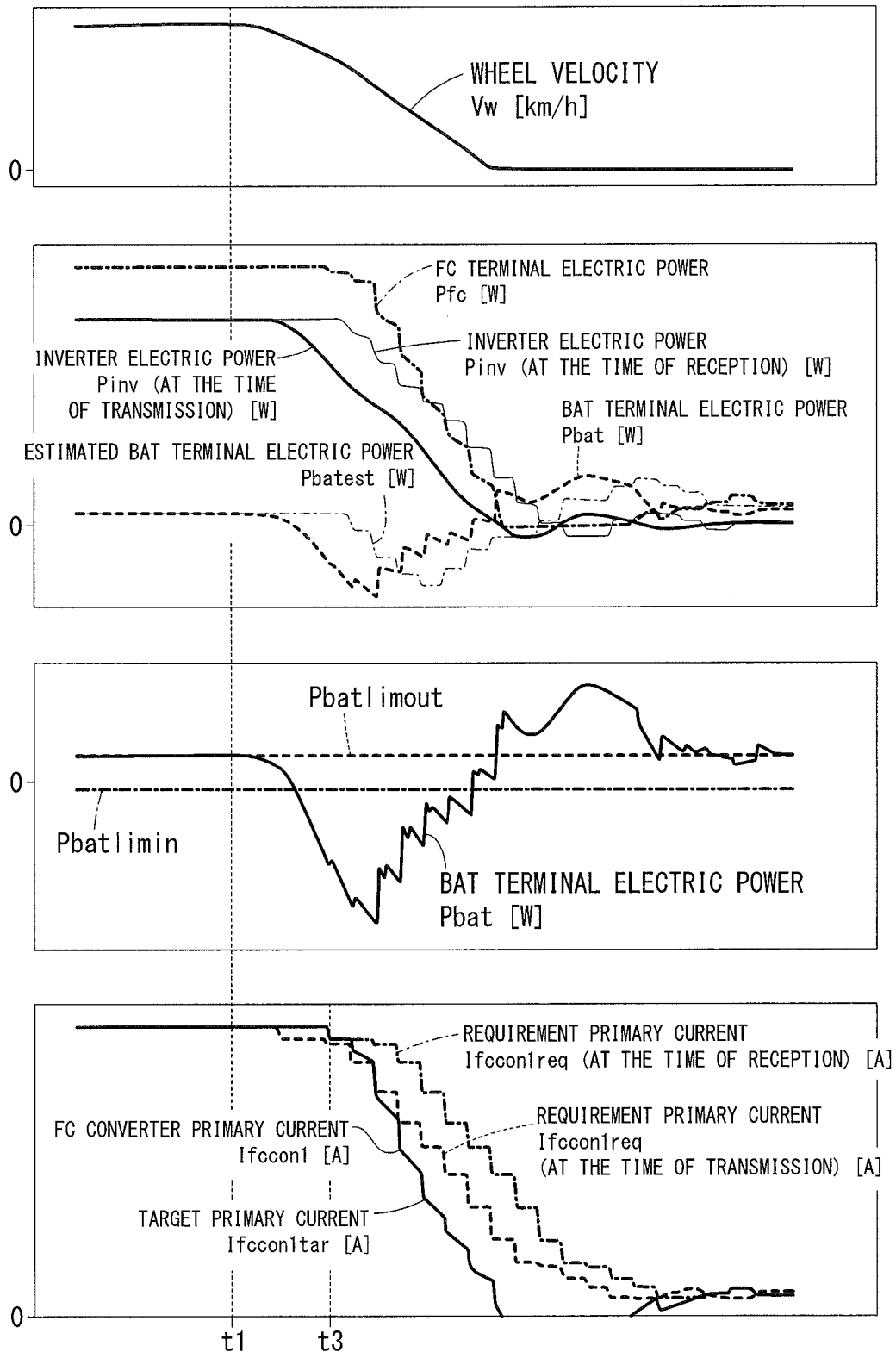
FIG. 10 is a time chart showing various sensor values and control values in a vehicle according to a comparative example.
Figure 11:
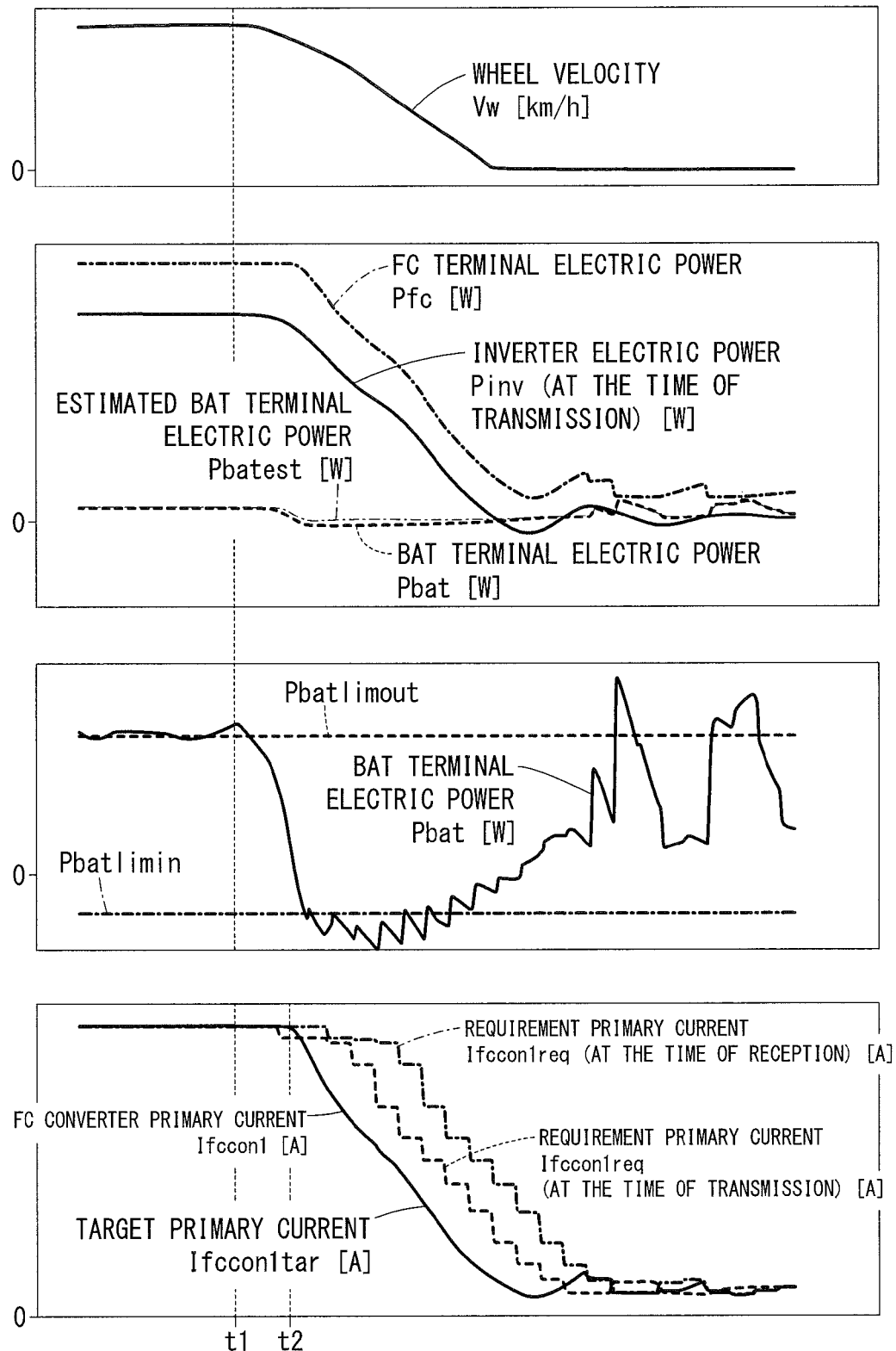
FIG. 11 is a time chart showing various sensor values and control values in a fuel cell vehicle according to the second embodiment.

FIG. 10 is a time chart showing various sensor values Mdir, Mcan, and control values Ccan in a fuel cell vehicle according to a comparative example. FIG. 11 is a time chart showing the various sensor values Mdir, Mcan and control values Ccan in the FC vehicle 10A according to the second embodiment. In the comparative example of FIG. 10, the primary current Ibatcon1 from the current sensor 134 is not directly inputted to the FC converter ECU 26a, but inputted to the FC converter ECU 26a through the CAN 70.

The wheel velocity Vw [km/h] is shown at the uppermost charts of FIGS. 10 and 11. The second charts from the top of FIG. 10 and FIG. 11 show the FC terminal electric power Pfc [W], the BAT terminal electric power Pbat [W], the estimated BAT terminal electric power Pbatest [W], and the inverter electric power Pinv [W] at the time of transmission by the MG ECU 50. Additionally, in FIG. 10, the inverter electric power Pinv [W] at the time of reception by the FC converter ECU 26a is shown.

The BAT terminal electric power Pbat [W] is shown at the third charts from the top of FIGS. 10 and 11. The BAT terminal electric power Pbat at the third charts is an enlargement of the BAT terminal electric power Pbat at the second charts. Both represent the same data. Further, as can be seen from the positions of the BAT terminal input limit value Pbatlimin and the BAT terminal output limit value Pbatlimout, it should be noted that in the third charts the scale of the BAT terminal electric power Pbat in FIG. 10 is different from the scale in FIG. 11 in the vertical direction.

At the fourth charts from the top of FIGS. 10 and 11, the primary current Ifccon1 [A] of the FC converter 24, the requirement primary current Ifccon1req [A] at the time of transmission by the MG ECU 50, the requirement primary current Ifccon1req [A] at the time of reception by the FC converter ECU 26a, and the target primary current Ifccon1tar [A] are shown. In the fourth charts of FIGS. 10 and 11, the primary current Ifccon1 matches the target primary current Ifccon1tar. This is because, in the comparative example, when the primary current Ifccon1 is decreased, the target primary current Ifccon1tar is not more than the primary current Ifccon1.

At the time point t1 of FIGS. 10 and 11, a hydraulic braking mechanism (not shown) is operated to lock the wheels (not shown). After the time point t1, as a result of the rapid decrease in the wheel velocity Vw, the BAT terminal electric power Pbat is switched from the discharging state to the charging state.

At this time, in comparison with the comparative example, in the second embodiment, decrease in the target primary current Ifccon1tar is started at an early stage. That is, in the comparative example, the target primary current Ifccon1tar is decreased from the time point t3. In contrast, in the second embodiment, the target primary current Ifccon1tar is decreased from the time point t2.

At the time of calculating the target primary current Ifccon1tar (BAT converter primary electric power Pbatcon1), the primary voltage Vbatcon1 of the BAT converter 34 is used (computation block 220 of FIG. 8 and S41 of FIG. 9). Further, in the second embodiment, the primary current Ibatcon1 is directly inputted from the current sensor 134 to the FC converter ECU 26a (FIG. 7). Therefore, in response to the change (decrease) in the primary current Ibatcon1, the FC converter ECU 26a of the second embodiment can promptly start to decrease the target primary current Ifccon1tar. In contrast, in the comparative example, the primary current Ibatcon1 is inputted to the FC converter ECU 26a through the CAN 70. Therefore, since there is a time difference D to the time when the primary current Ibatcon1 is inputted to the FC converter ECU 26a, it is not possible to promptly start to decrease the target primary current Ifccon1tar.

Since the primary current Ibatcon1 is handled in a different manner as described above, in comparison with the comparative example, in the second embodiment, excessive decrease in the BAT terminal electric power Pbat can be suppressed. That is, though the BAT terminal electric power Pbat of the second embodiment merely exceeds (or falls short of) the BAT terminal input limit value Pbatlimin slightly, the BAT terminal electric power Pbat of the comparative example exceeds (or falls short of) the BAT terminal input limit value Pbatlimin significantly.

B4. Advantages of Second Embodiment

In the above second embodiment, the following advantages are offered in addition to, or instead of the advantages of the first embodiment.

In the second embodiment, as the load which is different from the drive motor 12, auxiliary devices such as the air pump 28 are connected to the power line 142 connecting the battery 30 (energy storage device) and the BAT converter 34 (second converter) (FIG. 7). Further, the FC converter ECU 26a (first converter control unit) estimates the input electric power to the battery 30 or the output electric power from the battery 30 based on the primary electric power Pbatcon1 of the BAT converter 34 (see FIG. 9). In this manner, it becomes possible to monitor the state of the battery 30. Accordingly, it becomes possible to determine the design more freely, and excellent failsafe characteristics are achieved.

C. Third Embodiment

C1. Structure of the Third Embodiment (Difference From First and Second Embodiments)

Figure 12:
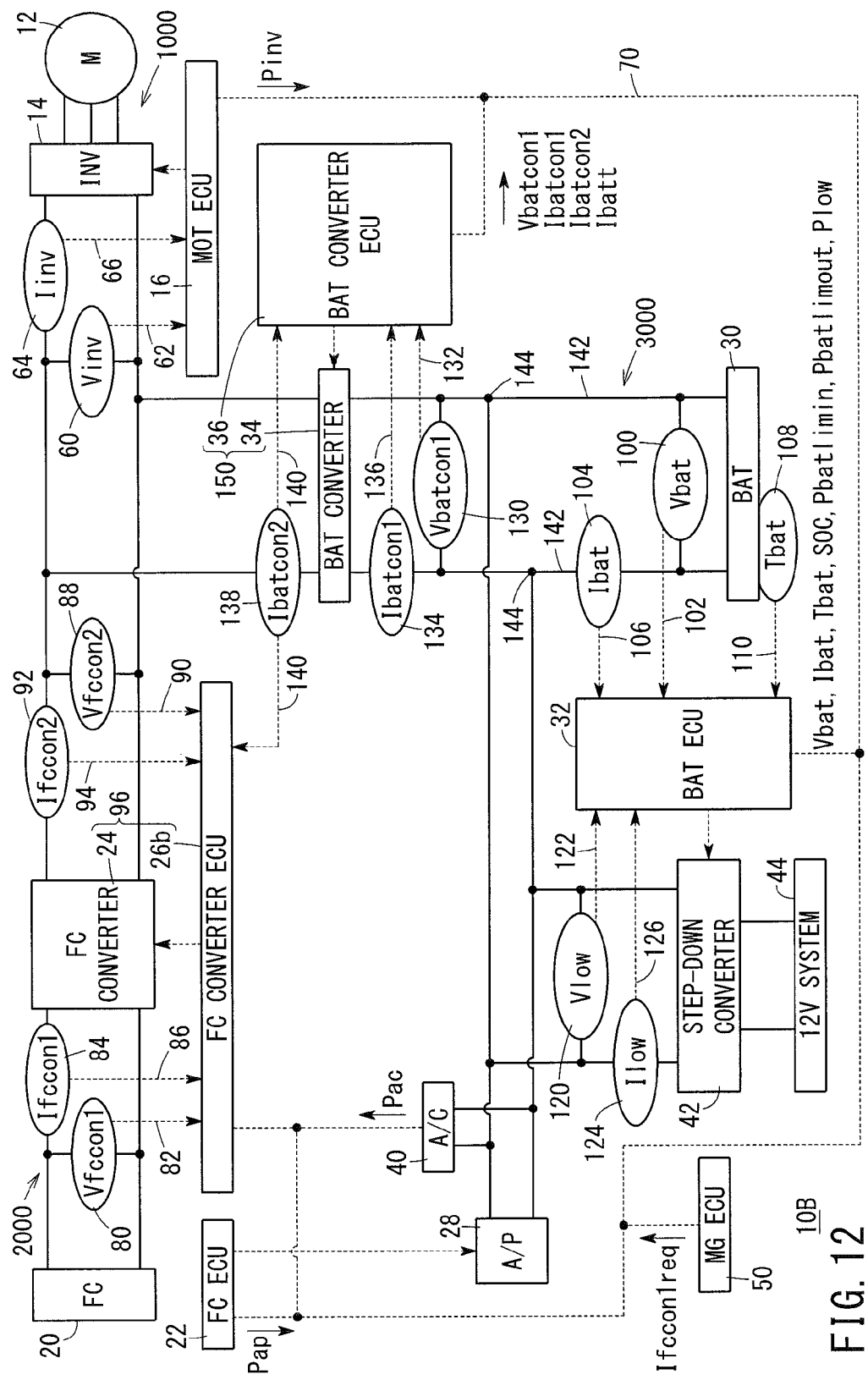
FIG. 12 is diagram schematically showing overall structure of a fuel cell vehicle as an electric power system according to a third embodiment of the present invention.

FIG. 12 is a diagram schematically showing overall structure of a fuel cell vehicle 10B (hereinafter referred to as the "FC vehicle 10B" or the "vehicle 10B") as an electric power system according to a third embodiment of the present invention. The constituent elements that are identical to those of the first and second embodiments are labeled with the same reference numerals, and description thereof will be omitted.

In the vehicle 10 of the first embodiment, the current sensor 104 is connected to the FC converter ECU 26 through the signal line 106, and the BAT terminal current Ibat is directly inputted to the FC converter ECU 26 (FIG. 1). In the vehicle 10A of the second embodiment, the current sensor 134 is connected to the FC converter ECU 26a through the signal line 136, and the primary current Ibatcon1 of the BAT converter 34 is directly inputted to the FC converter ECU 26a (FIG. 7). In contrast, in the vehicle 10B of the third embodiment, the current sensor 138 is connected to the FC converter electronic control unit 26b (hereinafter referred to as the "FC converter ECU 26b" or the "ECU 26b") through the signal line 140, and the secondary current Ibatcon2 of the BAT converter 34 is directly inputted to the FC converter ECU 26b (FIG. 12).

Further, in the FC converter ECU 26 of the first embodiment, the BAT terminal electric power Pbat calculated based on the BAT terminal voltage Vbat and the BAT terminal current Ibat is used (computation block 214 in FIG. 3 and S31 of FIG. 6). In the FC converter ECU 26a of the second embodiment, estimated BAT terminal electric power Pbatest estimated based on the primary voltage Vbatcon1 and the primary current Ibatcon1, etc. of the BAT converter 34 is used (computation blocks 214a, 220 of FIG. 8 and S41 to S43 of FIG. 9). In contrast, in the FC converter ECU 26b of the third embodiment, estimated BAT terminal electric power Pbatest2 estimated based on the secondary voltage Vfccon2 of the FC converter 24 (which is substantially equal to the secondary voltage of the BAT converter 34) and the secondary current Ibatcon2 of the BAT converter 34, etc. is used.

C2. Control of Third Embodiment (C2-1. Summary of FC Converter Control)

The summary of the control (FC converter control) of the FC converter 24 by the FC converter ECU 26b in the third embodiment is the same as that of the first and second embodiments (FIG. 2).

As described above, in the third embodiment, the current sensor 138 is connected to the FC converter ECU 26b through the signal line 140, and the secondary current Ibatcon2 of the BAT converter 34 is directly inputted to the FC converter ECU 26b (FIG. 12). Therefore, in the case of the third embodiment, the various sensor values Mdir directly inputted to the FC converter ECU 26b in step S1 of FIG. 2 include the secondary current Ibatcon2, and do not include the BAT terminal current Ibat and the primary current Ibatcon1. Further, the various sensor values Mcan directly inputted to the FC converter ECU 26b through the CAN 70 in step S2 of FIG. 2 include the BAT terminal current Ibat and the primary current Ibatcon1, and do not include the secondary current Ibatcon2.

Also in the third embodiment, the updating cycle Tdir in step S1 of FIG. 2 is shorter than the updating cycle Tcan in step S2.

(C2-2. Calculation of Target Primary Current Ifccon1tar of the FC Converter 24 (S3 of FIG. 2))

(C2-2-1. Overall Flow of Calculation of Target Primary Current Ifccon1tar)

Figure 13:
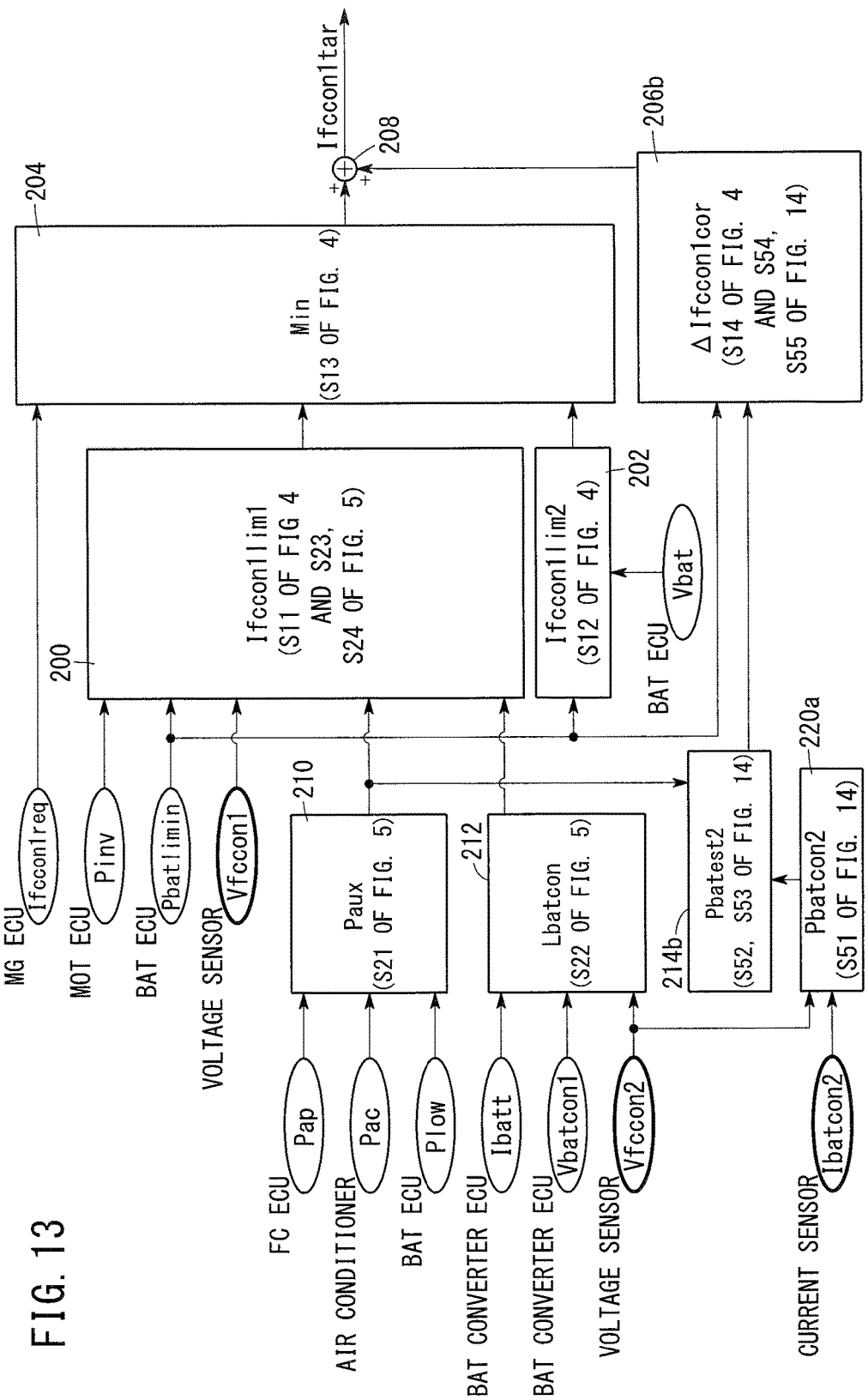
FIG. 13 is a diagram illustrating calculation of target primary current of the FC converter in the third embodiment.

FIG. 13 is a diagram illustrating calculation of target primary current Ifccon1tar of the FC converter 24 in the third embodiment. The summary of the flow chart (details of S3 of FIG. 2) of calculating the target primary current Ifccon1tar of the FC converter 24 in the third embodiment is the same as those of the first and second embodiments (FIG. 4). Further, the summary of calculation of the primary current limit value Ifccon1lim1 of the FC converter 24 (S11 of FIG. 4) from the viewpoint of protecting the battery 30 is the same as those of the first and second embodiments (FIG. 5). As for the difference between the FIG. 13 of the third embodiment from FIG. 3 of the first embodiment and FIG. 8 of the second embodiment, explanation will be given later with reference to FIG. 14.

(C2-2-2. Calculation of F/B Correction Value ΔIfccon1cor)

Figure 14:
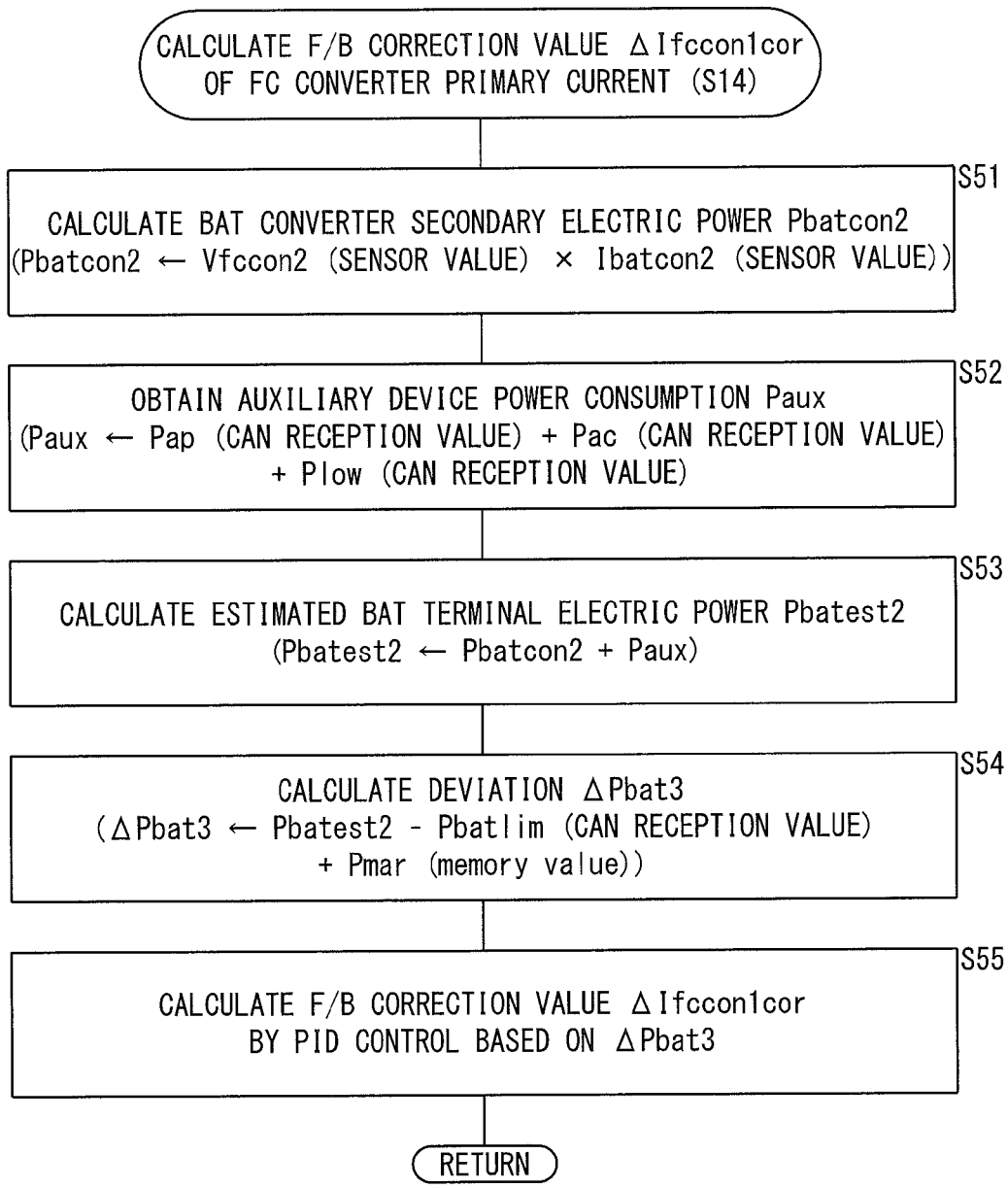
FIG. 14 is a flow chart (details of S14 of FIG. 4) for calculating a feedback correction value of primary current of the FC converter, in the third embodiment.

FIG. 14 is a flow chart for calculating the F/B correction value ΔIfccon1cor of the primary current Ifccon1 of the FC converter 24 (details of S14 of FIG. 4), in the third embodiment. In step S51 of FIG. 14 (computation block 220a of FIG. 13), the FC converter ECU 26b multiplies the secondary voltage Vfccon2 of the FC converter 24 by the secondary current Ibatcon2 of the BAT converter 34 to calculate the secondary electric power Pbatcon2 of the BAT converter 34.

As described above, in the third embodiment, the secondary voltage Vfccon2 from the voltage sensor 88 and the secondary current Ibatcon2 from the current sensor 138 are directly inputted to the FC converter ECU 26b (FIG. 12). Therefore, the secondary voltage Vfccon2 and the secondary current Ibatcon2 are sensor values Mdir directly obtained from the voltage sensor 88 and the current sensor 138 by the FC converter ECU 26b. Thus, the secondary voltage Vfccon2 and the secondary current Ibatcon2 are updated at the updating cycle Tdir.

In step S52 of FIG. 14 (computation block 214b of FIG. 13), the FC converter ECU 26b obtains the auxiliary power consumption Paux calculated in step S21 of FIG. 5 (computation block 210 of FIG. 13).

In step S53 (computation block 214b of FIG. 13), the ECU 26b adds up the secondary electric power Pbatcon2 of the BAT converter 34 and the auxiliary device power consumption Paux to calculate the estimated BAT terminal electric power Pbatest2.

In step S54 (computation block 206b of FIG. 13) of FIG. 14, the ECU 26b subtracts the BAT terminal input limit value Pbatlimin from the estimated BAT terminal electric power Pbatest2, and then, add a control margin Pmar to the estimated BAT terminal electric power Pbatest2, to calculate the deviation ΔPbat3. The estimated BAT terminal electric power Pbatest2 is computed in the computation block 214b (S53 of FIG. 14). The BAT terminal input limit value Pbatlimin is a sensor value Mcan obtained by the FC converter 24 through the CAN 70. Further, the control margin Pmar is a memory value stored in the memory unit of the FC converter ECU 26b. Since the estimated BAT terminal electric power Pbatest2 is computed at the control cycle Tc (<updating cycle Tcan), the deviation ΔPbat3 is also computed at the control cycle Tc (<updating cycle Tcan).

In step S55 of FIG. 14 (computation block 206b of FIG. 13), the FC converter ECU 26b implements PID control based on the deviation ΔPbat3 calculated in step S54 to calculate the F/B correction value ΔIfccon1cor.

C3. Advantages of Third Embodiment

In the third embodiment, in addition to the advantages of the first and second embodiments, the following advantages are obtained.

In the third embodiment, the FC converter ECU 26b (first converter control unit) estimates the input electric power to the battery 30 (energy storage device) or the output electric power from the battery 30 based on the secondary electric power Pbatcon2 of the BAT converter 34 (second converter) (see FIG. 14). In this manner, it becomes possible to monitor the state of the battery 30. Accordingly, it becomes possible to determine the design more freely, and excellent failsafe characteristics are achieved.

Also in the third embodiment, the same waveform as in the case of FIG. 11 can be obtained.

D. Fourth Embodiment

D1. Structure of Fourth Embodiment (Difference from First to Third Embodiments)

Figure 15:
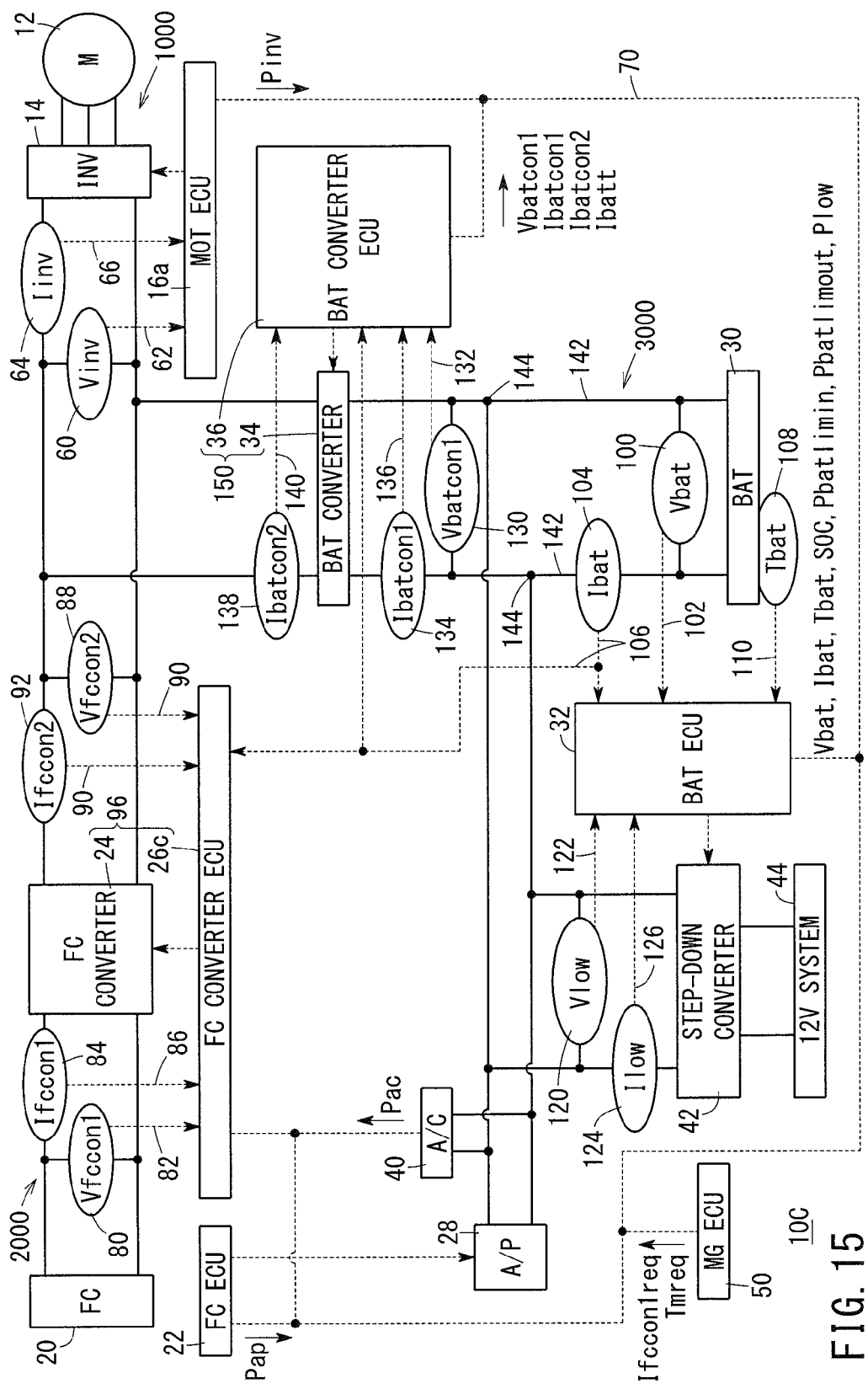
FIG. 15 is a diagram schematically showing overall structure of a fuel cell vehicle as an electric power system according to a fourth embodiment of the present invention.

FIG. 15 is a diagram schematically showing overall structure of a fuel cell vehicle 10C (hereinafter referred to as the "FC vehicle 10C" or the "vehicle 10C") as an electric power system according to a fourth embodiment of the present invention. The constituent elements that are identical to those of the first to third embodiments are labeled with the same reference numerals, and description thereof will be omitted.

In the vehicles 10, 10A, and 10B of the first to third embodiments, by implementing the control with the FC converter ECUs 26, 26a, 26b, protection of the battery 30 is achieved. In contrast, in the vehicle 10C according to the fourth embodiment, by implementing the control with the FC converter electronic control unit 26c (hereinafter referred to as the "FC converter ECU 26c" or the "ECU 26c"), and the motor electronic control unit 16a (hereinafter referred to as the "motor ECU 16a" or the "ECU 16a"), protection of the battery 30 is achieved. As shown in FIG. 15, the current sensor 104 is connected to the FC converter ECU 26c and the motor ECU 16a through the signal line 106, and the BAT terminal current Ibat is directly inputted to the ECUs 16a, 26c (FIG. 15).

The FC converter ECU 26c is substantially the same as the ECU 26 of the first embodiment. By locking of the wheels, etc., control is implemented to prevent the excessive input of electric power to the battery 30. Further, by spinning of the wheels, etc., the motor ECU 16a control is implemented to prevent excessive output of electric power from the battery 30.

D2. Control of Fourth Embodiment (D2-1. Control of FC Converter ECU 26c)

The summary of the control (FC converter control) of the FC converter 24 by the FC converter ECU 26c in the fourth embodiment is the same as that of the first embodiment (FIG. 2, etc.). The updating cycle Tdir in step S1 of FIG. 2 is shorter than the updating cycle Tcan in step S2. The same is true in the fourth embodiment.

(D2-2. Control of Motor ECU 16a)

(D2-2-1. Battery Protection Control)

Figure 16:
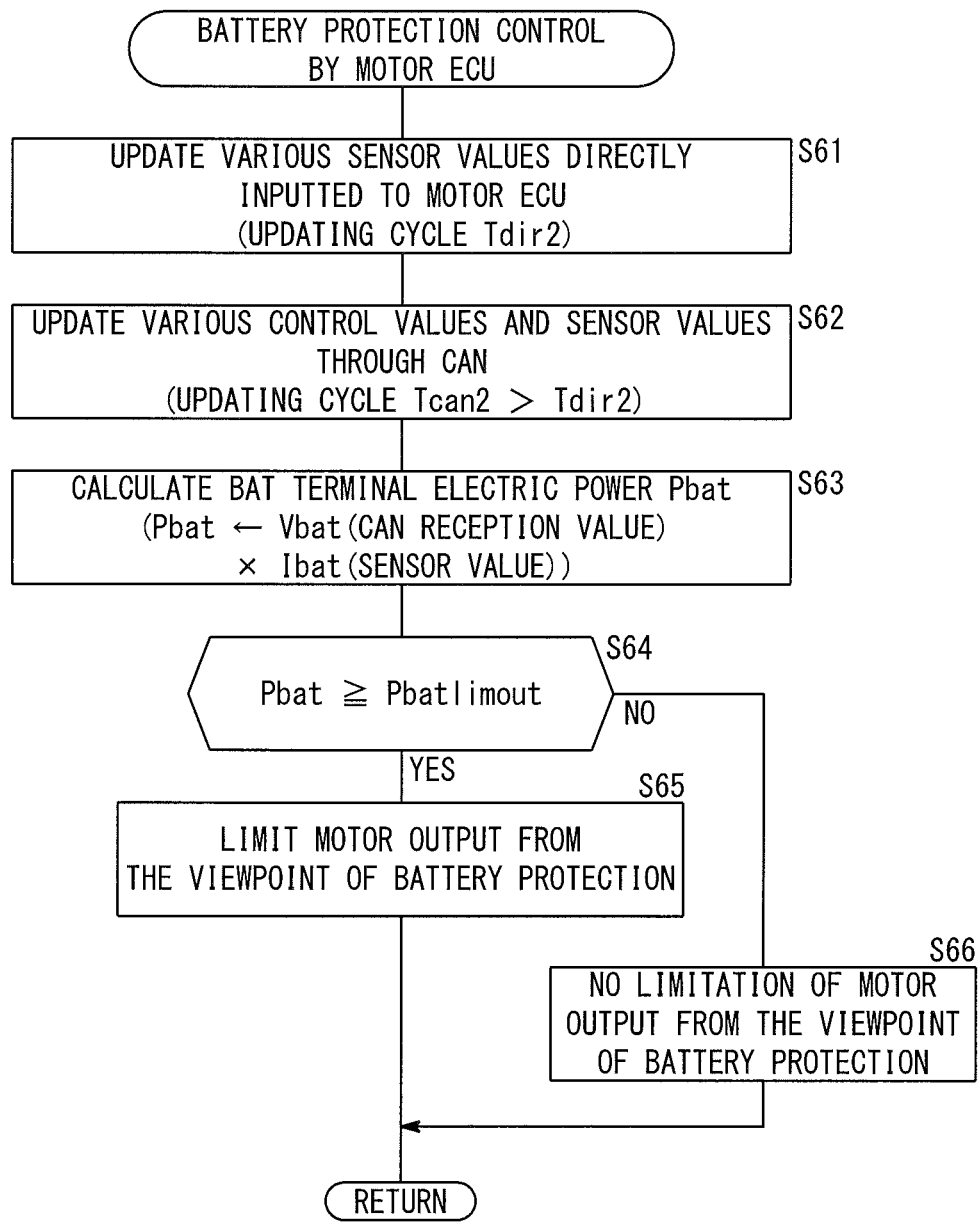
FIG. 16 is a flow chart for battery protection control by a motor electronic control unit in the fourth embodiment.

FIG. 16 is a flowchart showing battery protection control by the motor ECU 16a according to the fourth embodiment. In the battery protection control, the motor ECU 16a changes the output of the motor 12 through the inverter 14 to achieve protection of the battery 30.

In step S61 of FIG. 16, the motor ECU 16a updates various sensor values Mdir2 directly inputted to the motor ECU 16a. The various sensor values Mdir2 herein include the inverter voltage Vinv from the voltage sensor 60 and the inverter current Iinv from the current sensor 64. Further, in the fourth embodiment, the current sensor 104 is directly connected to the motor ECU 16a. Therefore, the BAT terminal current Ibat is also the sensor value Mdir2. The updating cycles Tdir2 of these sensor values Mdir2 is, e.g., several msec. The updating cycle Tdir2 may vary for each of the sensor values Mdir2.

In step S62, the motor ECU 16a updates various control value Ccan2 and the sensor value Mcan2 inputted through the CAN 70. For example, the control values Ccan2 herein includes the requirement torque Tmreq of the motor 12 from the MG ECU 50. Additionally, the control values Ccan2 include the BAT terminal output limit value Pbatlimout from the BAT ECU 32. Further, for example, the sensor values Mcan2 include the BAT terminal voltage Vbat.

The updating cycle Tcan2 of these control values Ccan2 and the sensor values Mcan2 is, e.g., several tens of msec. The updating cycle Tcan2 is longer than the updating cycle Tdir2. The updating cycle Tdir2 may vary for each of the control values Ccan2 or the sensor values Mcan2. The computation cycle (hereinafter referred to as the "control cycle Tc") of the steps S61 to S66 in FIG. 16 in the fourth embodiment is, e.g., several msec. The control cycle Tc2 is equal to the updating cycle Tdir2 of the sensor values Mdir2. For example, it may be possible to use the control cycle Tc2 which is shorter than the updating cycle Tdir2 or longer than the updating cycle Tdir2, from the viewpoint of making the updating cycle Tdir2 and the control cycle Tc2 shorter than the updating cycle Tcan2. In step S63, the motor ECU 16a multiplies the BAT terminal voltage Vbat by the BAT terminal current Ibat to calculate the BAT terminal electric power Pbat. As described above, in the fourth embodiment, the BAT terminal voltage Vbat from the voltage sensor 100 is inputted to the ECU 16a through the CAN 70, and the BAT terminal current Ibat from the current sensor 104 is directly inputted to the ECU 16a (FIG. 15). Thus, the BAT terminal voltage Vbat is the sensor value Mcan2 obtained by the ECU 16a through the CAN 70, and the BAT terminal current Ibat is the sensor value Mdir2 directly obtained by the ECU 16a from the current sensor 104. Accordingly, the BAT terminal voltage Vbat is updated at the updating cycle Tcan2, and the BAT terminal current Ibat is updated at the updating cycle Tdir2 (<Tcan2).

In step S64, the motor ECU 16a determines whether or not the BAT terminal electric power Pbat (S63) is the BAT terminal output limit value Pbatlimout or more. If the BAT terminal electric power Pbat is the limit value Pbatlimout or more (S64: YES), in step S65, the ECU 16a limits the output of the motor 12 from the viewpoint of protecting the battery 30. For example, the ECU 16a decreases the requirement torque Tmreq of the motor 12 by a predetermined amount. In the meanwhile, if the BAT terminal electric power Pbat is not the limit value Pbatlimout or more (S64: NO), in step S66, the ECU 16a does not limit the output of the motor 12 from the viewpoint of protecting the battery 30. For example, the ECU 16a uses the requirement torque Tmreq as it is without any change from the viewpoint of protecting the battery 30 (The ECU 16a may limit the output of the motor 12 from other viewpoints.).

D3. Advantages of Fourth Embodiment

In the fourth embodiment as described above, the following advantages are obtained in addition to, or instead of the advantages of the first to third embodiments.

In the fourth embodiment, the motor ECU 16a (motor control unit) controls the drive motor 12 using the requirement torque Tmreq (output command values) of the drive motor 12 obtained from the MG ECU 50 (electrical power management unit) through the CAN 70 (first signal system) and the BAT terminal current Ibat (parameter) obtained from the current sensor 104 (parameter acquisition unit) through the signal line 106 (second signal system) (FIG. 16). Therefore, for example, in the normal state, the requirement torque Tmreq is used mainly, and if an instantaneous change occurs in the BAT terminal current Ibat, etc. regarding inputs to, or outputs from the battery 30 (energy storage device) (e.g., rapid increase in the output electric power from the battery 30 resulting from rapid increase in the power consumption of the drive motor 12 due to skidding of the wheels, etc.), by focusing on the change of the BAT terminal current Ibat, etc., it becomes possible to control power generation of the FC 20 (power generation device). Therefore, it becomes possible to protect the battery 30 responsive to the rapid change in the input to, or output from the battery 30.

E. Modified Example

It is a matter of course that the present invention is not limited to the above described embodiments, and various structures can be adopted based on the description of this specification. For example, the following structure can be adopted.

E1. Applications where the Invention is Used

In the embodiments, the present invention is applied to the vehicles 10, 10A to 10C as electric power systems.

However, for example, from the viewpoint of utilizing a signal path (second signal system) different from the communications network such as the CAN 70 (first signal system), the present invention is not limited in this respect. For example, the present invention may be applied to an electric power system of other types. For example, the present invention may be applied to electric power systems for moving objects such as ships or airplanes. Alternatively, the present invention may be applied to electric power systems for robots, production apparatuses, home use electric power systems, or electric power systems for home appliances.

E2. Structure of Vehicles 10, 10A to 10C (E2-1. FC 20 (Power Generation Device))

In the above embodiments, the FC20 (and the motor 12 for regeneration) are used as the power generation device capable of supplying electric power to the battery 30 (FIG. 1, etc.). However, for example, from the viewpoint of the power generation device capable of supplying electric power to the battery 30, the present invention is not limited in this respect. For example, instead of the FC 20, or in addition to the FC 20, a generator driven by an engine or other energy storage devices (another battery, capacitor, etc.) which is different from the battery 30 may be used.

(E2-2. Drive Motor 12)

In the above embodiments, though the alternating current motor 12 is adopted, from the viewpoint of utilizing a signal path (second signal system) which is different from the communications network (first signal system) such as the CAN 70, etc., the present invention is not limited in this respect. For example, the motor 12 may be a direct current motor. In this case, an ON/OFF switch may be used instead of the inverter 14.

In the above embodiment, the motor 12 is used as a traction motor or a drive motor for the FC vehicles 10, 10A to 10C. However, for example, from the viewpoint of utilizing a signal path (second signal system) which is different from the communications network (first signal system) such as the CAN 70, etc., the present invention is not limited in this respect. For example, the motor 12 may be used for in-vehicle devices (such as an electric power steering device, an air compressor, the air conditioner 40).

(E2-3. FC Converter 24 and BAT Converter 34)

Figure 17:
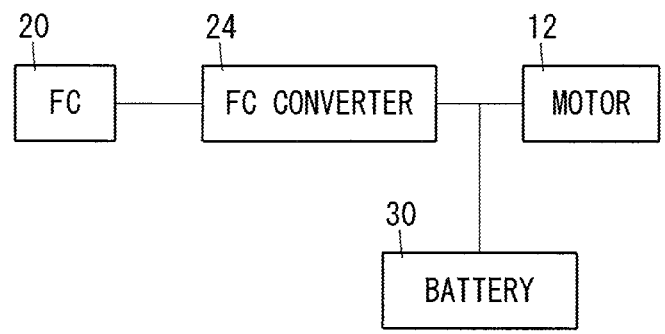
FIG. 17 is a block diagram schematically showing structure of a modified example of the fuel cell vehicle according to the first to fourth embodiments.

In the above embodiments, the FC 20 and the battery 30 are provided in parallel, the FC converter 24 as the step-up converter is provided in front of the FC 20, and the BAT converter 34 as the step-up/step-down converter is provided in front of the battery 30 (FIG. 1, etc.). However, for example, from the viewpoint of utilizing a signal path (second signal system) which is different from the communications network (first signal system) such as the CAN 70, the present invention is not limited in this respect. For example, the FC converter 24 provided in front of the FC 20 may be a step-up/step-down converter or a step-down converter, instead of the step-up converter. Alternatively, as shown in FIG. 17, the FC 20 and the battery 30 may be provided in parallel, and the FC converter 24 as a step-up, or step-down, or step-up/step-down DC/DC converter may be provided in front of the FC 20.

(E2-4. Current Sensors 104, 134, 138, etc. (Parameter Acquisition Unit))

In the first and fourth embodiments (FIGS. 1 and 15), the current sensor 104 is connected to the FC converters ECU 26, 26c through the signal line 106, and the BAT terminal current Ibat is directly inputted to the FC converter ECU 26, 26c. In the second embodiment (FIG. 7), the current sensor 134 is connected to the FC converter ECU 26a through the signal line 136, and the primary current Ibatcon1 of the BAT converter 34 is directly inputted to the ECU 26a. In the third embodiment (FIG. 12), the current sensor 138 is connected to the FC converter ECU 26b through the signal line 140, and the secondary current Ibatcon1 of the BAT converter 34 is directly inputted to the ECU 26b.

However, for example, from the viewpoint of directly inputting parameters regarding the input to, or output from the battery 30 (energy storage device) to the FC converter ECUs 26, 26a to 26c, the present invention is not limited in this respect. For example, in the cases of first and fourth embodiments, in addition to the BAT terminal current Ibat, or instead of the BAT terminal current Ibat, the BAT terminal voltage Vbat may be directly inputted to the FC converter ECUs 26, 26c. In the second embodiment, in addition to, or instead of the primary current Ibatcon1, the primary voltage Vbatcon1 is directly inputted to the FC converter ECU 26a.

In the fourth embodiment, the current sensor 104 is connected to the motor ECU 16a through the signal line 106, and the BAT terminal current Ibat is directly inputted to the ECU 16a (FIG. 15). However, for example, from the viewpoint of directly inputting parameters regarding the input to or the output from the battery 30 (energy storage device), to the motor ECU 16a, the present invention is not limited in this respect. For example, instead of, or in addition to the BAT terminal current Ibat, the BAT terminal voltage Vbat may be directly inputted to the motor ECU 16a. Further, for example, from the viewpoint of using the estimated BAT terminal electric power Pbatest, Pbatest2 (S43 of FIG. 9, S53 of FIG. 14) in the motor ECU 16a, the primary current Ibatcon1 of the BAT converter 34 detected by the current sensor 134 or the secondary current Ibatcon2 of the BAT converter 34 detected by the current sensor 138 may be directly inputted to the ECU 16a (see the second and third embodiments).

(E2-5. CAN 70 and Signal Lines 106, 136, 140 (First Signal System and Second Signal System)

In the first and fourth embodiments, the sensor values Mdir, Mdir2, Mcan, Mcan2, and control values Ccan, Ccan2 are inputted to the FC converter ECU 26, 26c, and the motor ECU 16a using the CAN 70 and the signal line 106 (FIGS. 1 and 15). However, for example, from the viewpoint of using the second signal system having the shorter arrival time to the destination point (FC converter ECUs 26, 26a to 26c) in comparison with the first signal system for transmitting the sensor values Mcan, Mcan2, and the control values Ccan, Ccan2, the present invention is not limited in this respect. For example, a low speed CAN may be used for the first signal system for transmitting the sensor values Mcan, Mcan2 and the control values Ccan, Ccan2, and a high speed CAN may be used for the second signal system for transmitting the sensor values Mdir, Mdir2. Alternatively, LIN (Local Interconnect Network), FlexRay, etc. may be used for the first signal system or the second signal system.

(E2-6. FC Converter ECUs 26, 26a to 26c)

In the FC converter ECUs 26, 26a to 26c of the above embodiments, in order to avoid overcharging of the battery 30, in the case where the input electric power to the battery 30 becomes large, the primary current Ifccon1 of the FC converter 24 is decreased (see FIG. 6, etc.). However, for example, from the viewpoint of protecting the battery 30, the present invention is not limited in this respect. For example, in the FC converter ECUs 26, and 26a to 26c, in order to avoid overdischarging by the battery 30, in the case where the output electric power from the battery 30 is large (in the case where the output electric power or parameters related to the output electric power exceeds a predetermined threshold value), it is possible to increase the primary current Ifccon1 of the FC converter 24.

In the first embodiment, the FC converter ECU 26 corrects the requirement primary current Ifccon1req (power generation command value of the FC 20 (power generation device)) obtained from the MG ECU 50 through the CAN 70 (first signal system) using the BAT terminal current Ibat (parameter) (FIG. 1) obtained from the current sensor 104 (parameter acquisition unit) through the signal line 106 (second signal system) to control the FC 20 (power generation device) (FIGS. 3 and 6, etc.).

However, for example, from the viewpoint of using the requirement primary current Ifccon1req (power generation command value of the FC 20 (power generation device)) obtained through the CAN 70 (first signal system) and the BAT terminal current Ibat (parameter) obtained from the current sensor 104 (parameter acquisition unit) through the signal line 106 (second signal system), the present invention is not limited in this respect. For example, in the case where a rapid change (change exceeding a threshold value) has occurred in the BAT terminal current Ibat, it is possible to control the FC 20 based on the BAT terminal electric current Ibat without using the requirement primary current Ifccon1req. The same holds for the FC converter ECUs 26a to 26c according to the second to fourth embodiments.

In the above embodiments, the FC converter ECUs 26, 26a to 26c use the requirement primary current Ifccon1req obtained from the MG ECU 50 through the CAN 70 (first signal system) as the power generation command value of the FC 20 (power generation device (FIG. 1, etc.). However, for example, from the viewpoint of controlling power generation of the FC 20 (power generation device), the present invention is not limited in this respect. The requirement values of the secondary current Ifccon2 of the FC converter ECUs 26, 26a to 26c may be used as power generation command values of the FC 20.

In the above embodiments, the primary current limit value Ifccon1lim2 of the FC converter 24 (input electric power threshold value of the battery 30 (energy storage device) is determined based on the temperature Tbat and the SOC of the battery 30 (S12 of FIG. 4). However, from the viewpoint of setting the primary current limit value Ifccon1lim2, it is also possible to set the primary current limit value Ifccon1lim2 only using one of the temperature Tbat and SOC of the battery 30. Further, for example, from the viewpoint of determining the primary current limit value Ifccon1lim1, it is also possible not to set the primary current limit value Ifccon1lim2.

(E2-7. Motor ECU 16a)

In the motor ECU 16a of the fourth embodiment, in order to avoid overdischarging of the battery 30, in the case where the output electrical power from the battery 30 is large, the output of the motor 12 is limited (see FIG. 16). However, for example, from the viewpoint of protecting the battery 30, the present invention is not limited in this respect. For example, in the motor ECU 16a, in order to avoid overcharging of the battery 30, in the case where the input electric power to the battery 30 is large (in the case where the input electric power or the associated parameter exceeds a predetermined threshold value), it is also possible to temporarily increase the output of the motor 12.

In the fourth embodiment, the motor ECU 16a corrects the requirement torque Tmreq (output command values of the motor 12) obtained from the MG ECU 50 through the CAN 70 (first signal system) using the BAT terminal current Ibat (parameter) obtained from the current sensor 104 (parameter acquisition unit) through the signal line 106 (second signal system) (FIG. 15) to control the motor 12 (FIG. 16). However, for example, from the viewpoint of using the requirement torque Tmreq (output command value of the motor 12) obtained through the CAN 70 (first signal system) and the BAT terminal current Ibat (parameter) obtained from the current sensor 104 (parameter acquisition unit) through the signal line 106 (second signal system), the present invention is not limited in this respect. For example, in the case where a rapid change (change above a threshold value) has occurred in the BAT terminal current Ibat, it is also possible to control the motor 12 based on the BAT terminal current Ibat without using the requirement torque Tmreq.

The invention claimed is:

1. An electric power system comprising:
    a power generation device;
    an energy storage device;
    a drive motor driven by electric power from the power generation device and the energy storage device;
    a power generation control unit configured to control a power generation amount of the power generation device;
    a parameter acquisition unit configured to obtain a parameter regarding an input to, or an output from the energy storage device;
    an electric power management unit provided separately from the power generation control unit;
    a first signal system connecting the power generation control unit and the electric power management unit; and
    a second signal system bypassing the electric power management unit and connecting the power generation control unit and the parameter acquisition unit,
    wherein the electric power management unit is configured to manage an amount of power generation of the electric power system as a whole, and
    the power generation control unit is configured to use a power generation command value of the power generation device obtained from the electric power management unit through the first signal system and the parameter obtained from the parameter acquisition unit through the second signal system to control the power generation device.

2. The electric power system according to claim 1, wherein the power generation control unit is configured to correct a power generation command value of the power generation device obtained from the electric power management unit through the first signal system or a limit value of the power generation command value, using the parameter obtained from the parameter acquisition unit through the second signal system, to control the power generation device.

3. The electric power system according to claim 2, wherein the power generation control unit is configured to obtain the power generation command value of the power generation device from the electric power management unit through the first signal system at a first cycle;
    the parameter is obtained from the parameter acquisition unit through the second signal system at a second cycle which is shorter than the first cycle; and
    control of the power generation device using the power generation command value corrected using the parameter is implemented at a third cycle which is smaller than the first cycle.

4. The electric power system according to claim 1, wherein the power generation control unit is configured to limit an output from the power generation device when input electric power to the energy storage device exceeds an input electric power threshold value, or to increase the output from the power generation device when output electric power from the energy storage device exceeds an output electric power threshold value.

5. The electric power system according to claim 4,
    wherein the power generation device includes a fuel cell, and
    the power generation control unit includes:
    a first converter provided for the fuel cell; and
    a first converter control unit configured to control the first converter, and
    the electric power system includes:
    a second converter provided for the energy storage device; and
    a second converter control unit configured to control the second converter,
    when the input electric power to the energy storage device exceeds the input electric power threshold value, the first converter control unit is configured to limit an output current of the fuel cell, and change an output current limit value of the fuel cell based on the input electric power threshold value of the energy storage device; or
    when the output electric power from the energy storage device exceeds the output electric power threshold value, the first converter control unit is configured to increase the output current of the fuel cell, and change an output current limit value of the fuel cell based on the output electric power threshold value of the energy storage device.

6. The electric power system according to claim 5, wherein the input electric power threshold value or the output electric power threshold value of the energy storage device is determined based on a remaining capacity of the energy storage device or a temperature of the energy storage device.

7. The electric power system according to claim 5, wherein the first converter control unit is configured to correct outputs of the fuel cell based on a deviation between the input electric power and the input electric power threshold value of the energy storage device or a deviation between the output electric power and the output electric power threshold value of the energy storage device.

8. The electric power system according to claim 5, wherein a load which is different from the drive motor is connected to a power line connecting the energy storage device and the second converter; and
   the first converter control unit is configured to estimate input electric power to the energy storage device or output electric power from the energy storage device based on primary electric power of the second converter.

9. The electric power system according to claim 5, wherein the first converter control unit is configured to estimate the input electric power to the energy storage device or the output electric power from the energy storage device based on secondary electric power of the second converter.

10. An electric power system comprising:
   a power generation device;
   an energy storage device;
   a drive motor driven by electric power from the power generation device and the energy storage device;
   a motor control unit configured to control an output from the drive motor;
   a power generation control unit configured to control a power generation amount of the power generation device;
   a parameter acquisition unit configured to obtain a parameter regarding an input to, or an output from the energy storage device;
   an electric power management unit provided separately from the motor control unit and the power generation control unit;
   a first signal system connecting the motor control unit and the electric power management unit; and
   a second signal system bypassing the electric power management unit and connecting the motor control unit and the parameter acquisition unit,
   wherein the motor control unit is configured to use an output command value of the drive motor obtained from the electric power management unit through the first signal system and the parameter obtained from the parameter acquisition unit through the second signal system to control the drive motor.

* * * * *